US009930387B2

United States Patent
LaJoie

(10) Patent No.: US 9,930,387 B2
(45) Date of Patent: Mar. 27, 2018

(54) METHOD AND APPARATUS FOR NETWORK BANDWIDTH CONSERVATION

(71) Applicant: Time Warner Cable Enterprises LLC, New York, NY (US)

(72) Inventor: Michael L. LaJoie, Stamford, CT (US)

(73) Assignee: Time Warner Cable Enterprises LLC, St. Louis, MO (US)

(*) Notice: Subject to any disclaimer, the term of this patent is extended or adjusted under 35 U.S.C. 154(b) by 0 days.

(21) Appl. No.: 15/083,037

(22) Filed: Mar. 28, 2016

(65) Prior Publication Data

US 2016/0269764 A1    Sep. 15, 2016

Related U.S. Application Data

(60) Division of application No. 13/346,606, filed on Jan. 9, 2012, now Pat. No. 9,300,999, which is a
(Continued)

(51) Int. Cl.
    *H04H 60/32* (2008.01)
    *H04N 7/173* (2011.01)
    (Continued)

(52) U.S. Cl.
    CPC ........ *H04N 21/2407* (2013.01); *H04H 60/33* (2013.01); *H04L 12/2801* (2013.01);
    (Continued)

(58) Field of Classification Search
    USPC .................................. 725/74–104
    See application file for complete search history.

(56) References Cited

U.S. PATENT DOCUMENTS

| 4,521,881 A | 6/1985 | Stapleford et al. |
| 4,546,382 A | 10/1985 | McKenna et al. |

(Continued)

FOREIGN PATENT DOCUMENTS

| CA | 2643806 C | 6/2013 |
| GB | 2405567 A | 3/2005 |

(Continued)

OTHER PUBLICATIONS

Cisco Intelligent Network Architecture for Digital Video—SCTE Cable-Tec Expo 2004 information page, Orange County Convention Center, Jun. 2004, 24 pages.

(Continued)

*Primary Examiner* — Mushfikh Alam
(74) *Attorney, Agent, or Firm* — Gazdzinski & Associates, PC

(57) ABSTRACT

Methods and apparatus for conserving bandwidth within a network based on two or more different service levels. In an exemplary embodiment, programming that is simulcast on two or more program channels is mapped to one physical channel during periods when the programming is scheduled at only one service level (e.g., standard definition), thereby conserving bandwidth on the network that would otherwise be consumed by the simultaneous broadcast on the two or more channels. When the programming service level becomes heterogeneous across the channels (e.g., SD and HD simulcast), physical channel(s) supporting the HD content are provided within a local service area only "on-demand" using, for example, a switched digital channel allocation. Accordingly, no HD broadcast occurs within a given area until at least one user requests it, thereby further conserving network bandwidth.

22 Claims, 12 Drawing Sheets

Related U.S. Application Data continuation of application No. 12/231,204, filed on Aug. 28, 2008, now Pat. No. 8,094,656, which is a continuation of application No. 11/048,348, filed on Feb. 1, 2005, now Pat. No. 7,567,565.

(51) Int. Cl.
| | |
|---|---|
| *H04N 21/24* | (2011.01) |
| *H04L 12/28* | (2006.01) |
| *H04N 21/2343* | (2011.01) |
| *H04N 21/262* | (2011.01) |
| *H04N 21/462* | (2011.01) |
| *H04H 60/33* | (2008.01) |
| *H04N 21/2385* | (2011.01) |
| *H04N 21/442* | (2011.01) |

(52) U.S. Cl.
CPC ..... *H04N 7/17309* (2013.01); *H04N 21/2385* (2013.01); *H04N 21/23439* (2013.01); *H04N 21/2402* (2013.01); *H04N 21/26216* (2013.01); *H04N 21/26241* (2013.01); *H04N 21/26275* (2013.01); *H04N 21/44222* (2013.01); *H04N 21/4622* (2013.01)

(56) References Cited

U.S. PATENT DOCUMENTS

| | | |
|---|---|---|
| 4,602,279 A | 7/1986 | Freeman |
| 4,930,120 A | 5/1990 | Baxter et al. |
| 5,155,591 A | 10/1992 | Wachob |
| 5,313,454 A | 5/1994 | Bustini et al. |
| 5,600,364 A | 2/1997 | Hendricks et al. |
| RE35,651 E | 11/1997 | Bradley et al. |
| 5,734,380 A | 3/1998 | Adams et al. |
| 5,758,257 A | 5/1998 | Herz et al. |
| 5,774,170 A | 6/1998 | Hite et al. |
| 5,793,410 A | 8/1998 | Rao |
| 5,815,662 A | 9/1998 | Ong |
| 5,862,312 A | 1/1999 | Mann et al. |
| 5,878,324 A | 3/1999 | Borth et al. |
| 5,886,995 A | 3/1999 | Arsenault et al. |
| 5,914,945 A | 6/1999 | Abu-Amara et al. |
| 5,926,205 A | 7/1999 | Krause et al. |
| 5,935,206 A | 8/1999 | Dixon et al. |
| 5,963,844 A | 10/1999 | Dail |
| 6,002,393 A | 12/1999 | Hite et al. |
| 6,047,327 A | 4/2000 | Tso et al. |
| 6,081,830 A | 6/2000 | Schindler |
| 6,092,178 A | 7/2000 | Jindal et al. |
| 6,105,134 A | 8/2000 | Pinder et al. |
| 6,124,878 A | 9/2000 | Adams et al. |
| 6,128,316 A | 10/2000 | Takeda et al. |
| 6,134,532 A | 10/2000 | Lazarus et al. |
| 6,157,377 A | 12/2000 | Shah-Nazaroff et al. |
| 6,161,142 A | 12/2000 | Wolfe et al. |
| 6,167,432 A | 12/2000 | Jiang |
| 6,169,728 B1 | 1/2001 | Perreault et al. |
| 6,175,856 B1 | 1/2001 | Riddle |
| 6,182,050 B1 | 1/2001 | Ballard |
| 6,211,869 B1 | 4/2001 | Loveman et al. |
| 6,211,901 B1 | 4/2001 | Imajima et al. |
| 6,216,129 B1 | 4/2001 | Eldering |
| 6,216,152 B1 | 4/2001 | Wong et al. |
| 6,219,710 B1 | 4/2001 | Gray et al. |
| 6,219,840 B1 | 4/2001 | Corrigan et al. |
| 6,240,243 B1 | 5/2001 | Chen et al. |
| 6,240,553 B1 | 5/2001 | Son et al. |
| 6,252,964 B1 | 6/2001 | Wasilewski et al. |
| 6,256,393 B1 | 7/2001 | Safadi et al. |
| 6,330,609 B1 * | 12/2001 | Garofalakis ......... H04Q 3/0066 709/229 |
| 6,337,715 B1 | 1/2002 | Inagaki et al. |
| 6,345,279 B1 | 2/2002 | Li et al. |
| 6,353,626 B1 | 3/2002 | Sunay et al. |
| 6,378,130 B1 | 4/2002 | Adams |
| 6,434,141 B1 | 8/2002 | Oz et al. |
| 6,446,261 B1 | 9/2002 | Rosser |
| 6,463,508 B1 | 10/2002 | Wolf et al. |
| 6,463,585 B1 | 10/2002 | Hendricks et al. |
| 6,498,783 B1 | 12/2002 | Lin |
| 6,502,139 B1 | 12/2002 | Birk et al. |
| 6,516,412 B2 | 2/2003 | Wasilewski et al. |
| 6,560,578 B2 | 5/2003 | Eldering |
| 6,590,865 B1 | 7/2003 | Ibaraki et al. |
| 6,594,699 B1 | 7/2003 | Sahai et al. |
| 6,601,237 B1 | 7/2003 | Ten et al. |
| 6,604,138 B1 | 8/2003 | Virine et al. |
| 6,615,039 B1 | 9/2003 | Eldering |
| 6,615,251 B1 | 9/2003 | Klug et al. |
| 6,651,103 B1 | 11/2003 | Markowitz et al. |
| 6,671,736 B2 | 12/2003 | Virine et al. |
| 6,687,735 B1 | 2/2004 | Logston et al. |
| 6,700,624 B2 | 3/2004 | Yun |
| 6,718,551 B1 | 4/2004 | Swix et al. |
| 6,725,459 B2 | 4/2004 | Bacon |
| 6,728,269 B1 | 4/2004 | Godwin et al. |
| 6,728,840 B1 | 4/2004 | Shatil et al. |
| 6,738,978 B1 | 5/2004 | Hendricks et al. |
| 6,742,187 B1 | 5/2004 | Vogel |
| 6,745,245 B1 | 6/2004 | Carpenter |
| 6,763,391 B1 | 7/2004 | Ludtke |
| 6,771,290 B1 | 8/2004 | Hoyle |
| 6,772,435 B1 | 8/2004 | Thexton et al. |
| 6,775,843 B1 | 8/2004 | McDermott |
| 6,799,196 B1 | 9/2004 | Smith |
| 6,842,783 B1 | 1/2005 | Boivie et al. |
| 6,859,839 B1 | 2/2005 | Zahorjan et al. |
| 6,868,439 B2 | 3/2005 | Basu et al. |
| 6,891,841 B2 | 5/2005 | Leatherbury et al. |
| 6,898,800 B2 | 5/2005 | Son et al. |
| 6,917,628 B2 | 7/2005 | McKinnin et al. |
| 6,944,166 B1 | 9/2005 | Perinpanathan et al. |
| 6,948,183 B1 | 9/2005 | Peterka |
| 6,961,430 B1 | 11/2005 | Gaske et al. |
| 6,977,691 B1 * | 12/2005 | Middleton ............ H04H 20/28 348/473 |
| 6,981,045 B1 | 12/2005 | Brooks |
| 6,985,934 B1 | 1/2006 | Armstrong et al. |
| 6,986,156 B1 | 1/2006 | Rodriguez et al. |
| 7,010,801 B1 | 3/2006 | Jerding et al. |
| 7,024,461 B1 | 4/2006 | Janning et al. |
| 7,024,676 B1 | 4/2006 | Klopfenstein |
| 7,027,460 B2 | 4/2006 | Iyer et al. |
| 7,039,116 B1 | 5/2006 | Zhang et al. |
| 7,039,169 B2 | 5/2006 | Jones |
| 7,039,614 B1 | 5/2006 | Candelore |
| 7,039,938 B2 | 5/2006 | Candelore |
| 7,047,309 B2 | 5/2006 | Baumann et al. |
| 7,058,387 B2 | 6/2006 | Kumar et al. |
| 7,069,573 B1 | 6/2006 | Brooks et al. |
| 7,075,945 B2 | 7/2006 | Arsenault et al. |
| 7,086,077 B2 | 8/2006 | Giammaressi |
| 7,089,577 B1 | 8/2006 | Rakib et al. |
| 7,093,272 B1 | 8/2006 | Shah-Nazaroff et al. |
| 7,100,183 B2 | 8/2006 | Kunkel et al. |
| 7,103,906 B1 | 9/2006 | Katz et al. |
| 7,107,462 B2 | 9/2006 | Fransdonk |
| 7,110,457 B1 * | 9/2006 | Chen ................... H04H 20/33 375/240.25 |
| 7,127,619 B2 | 10/2006 | Unger et al. |
| 7,133,837 B1 | 11/2006 | Barnes, Jr. |
| 7,143,431 B1 | 11/2006 | Eager et al. |
| 7,146,627 B1 | 12/2006 | Ismail et al. |
| 7,152,237 B2 | 12/2006 | Flickinger et al. |
| 7,155,508 B2 | 12/2006 | Sankuratripati et al. |
| 7,174,385 B2 | 2/2007 | Li |
| 7,178,161 B1 | 2/2007 | Fristoe et al. |
| 7,181,010 B2 | 2/2007 | Russ et al. |
| 7,181,760 B1 | 2/2007 | Wallace |
| 7,191,461 B1 | 3/2007 | Arsenault et al. |
| 7,194,752 B1 * | 3/2007 | Kenyon ................. G10L 25/48 382/118 |

(56) References Cited

U.S. PATENT DOCUMENTS

| | | | |
|---|---|---|---|
| 7,194,756 B2 | 3/2007 | Addington et al. | |
| 7,200,788 B2 | 4/2007 | Hiraki et al. | |
| 7,203,940 B2 | 4/2007 | Barmettler et al. | |
| 7,207,055 B1 | 4/2007 | Hendricks et al. | |
| 7,216,265 B2 | 5/2007 | Hughes et al. | |
| 7,225,164 B1 | 5/2007 | Candelore et al. | |
| 7,225,458 B2 | 5/2007 | Klauss et al. | |
| 7,228,555 B2 | 6/2007 | Schlack | |
| 7,237,250 B2 | 6/2007 | Kanojia et al. | |
| 7,246,150 B1 | 7/2007 | Donoho et al. | |
| 7,246,172 B2 | 7/2007 | Yoshiba et al. | |
| 7,246,366 B1 | 7/2007 | Addington et al. | |
| 7,254,608 B2 | 8/2007 | Yeager et al. | |
| 7,257,650 B2 | 8/2007 | Maciesowicz | |
| 7,266,198 B2 | 9/2007 | Medvinsky | |
| 7,266,611 B2 | 9/2007 | Jabri et al. | |
| 7,266,726 B1 | 9/2007 | Ladd et al. | |
| 7,283,782 B2 | 10/2007 | Sinnarajah et al. | |
| 7,296,074 B2 * | 11/2007 | Jagels | H04L 29/06027 709/227 |
| 7,305,691 B2 | 12/2007 | Cristofalo | |
| 7,308,415 B2 | 12/2007 | Kimbrel et al. | |
| 7,317,728 B2 | 1/2008 | Acharya et al. | |
| 7,320,134 B1 | 1/2008 | Tomsen et al. | |
| 7,325,073 B2 | 1/2008 | Shao et al. | |
| 7,327,692 B2 | 2/2008 | Ain et al. | |
| 7,334,044 B1 | 2/2008 | Allen | |
| 7,340,759 B1 | 3/2008 | Rodriguez | |
| 7,346,688 B2 | 3/2008 | Allen et al. | |
| 7,352,775 B2 | 4/2008 | Powell | |
| 7,355,980 B2 | 4/2008 | Bauer et al. | |
| 7,363,371 B2 | 4/2008 | Kirby et al. | |
| 7,370,120 B2 | 5/2008 | Kirsch et al. | |
| 7,376,386 B2 | 5/2008 | Phillips et al. | |
| 7,379,494 B2 | 5/2008 | Raleigh et al. | |
| 7,403,618 B2 | 7/2008 | Van et al. | |
| 7,434,245 B1 | 10/2008 | Shiga et al. | |
| 7,464,179 B2 | 12/2008 | Hodges et al. | |
| 7,567,565 B2 | 7/2009 | La | |
| 7,577,118 B2 | 8/2009 | Haumonte et al. | |
| 7,602,820 B2 | 10/2009 | Helms et al. | |
| 7,617,516 B2 | 11/2009 | Huslak et al. | |
| 7,630,401 B2 | 12/2009 | Iwamura | |
| 7,690,020 B2 | 3/2010 | Lebar | |
| 7,757,251 B2 | 7/2010 | Gonder et al. | |
| 7,783,316 B1 | 8/2010 | Mitchell | |
| 7,805,052 B2 * | 9/2010 | Nakamura | G11B 27/105 348/552 |
| 7,836,178 B1 | 11/2010 | Bedell et al. | |
| 7,930,715 B2 | 4/2011 | Hendricks et al. | |
| 8,170,065 B2 | 5/2012 | Hasek et al. | |
| 8,290,351 B2 | 10/2012 | Plotnick et al. | |
| 8,365,212 B1 | 1/2013 | Orlowski | |
| 8,458,125 B1 | 6/2013 | Chong, Jr. et al. | |
| 8,468,099 B2 | 6/2013 | Headings et al. | |
| 8,726,303 B2 | 5/2014 | Ellis, III | |
| 2001/0013123 A1 | 8/2001 | Freeman et al. | |
| 2001/0030785 A1 | 10/2001 | Pangrac et al. | |
| 2001/0050901 A1 | 12/2001 | Love et al. | |
| 2002/0004912 A1 | 1/2002 | Fung | |
| 2002/0019984 A1 | 2/2002 | Rakib | |
| 2002/0032754 A1 | 3/2002 | Logston et al. | |
| 2002/0049902 A1 | 4/2002 | Rhodes | |
| 2002/0049980 A1 | 4/2002 | Hoang | |
| 2002/0053082 A1 | 5/2002 | Weaver et al. | |
| 2002/0054589 A1 | 5/2002 | Ethridge et al. | |
| 2002/0059577 A1 | 5/2002 | Lu et al. | |
| 2002/0059619 A1 | 5/2002 | Lebar | |
| 2002/0063621 A1 | 5/2002 | Tseng et al. | |
| 2002/0087975 A1 | 7/2002 | Schlack | |
| 2002/0087976 A1 | 7/2002 | Kaplan et al. | |
| 2002/0095684 A1 | 7/2002 | St John et al. | |
| 2002/0100059 A1 | 7/2002 | Buehl et al. | |
| 2002/0104083 A1 | 8/2002 | Hendricks et al. | |
| 2002/0112240 A1 | 8/2002 | Bacso et al. | |
| 2002/0120498 A1 | 8/2002 | Gordon et al. | |
| 2002/0123928 A1 | 9/2002 | Eldering et al. | |
| 2002/0124182 A1 | 9/2002 | Bacso et al. | |
| 2002/0129378 A1 | 9/2002 | Cloonan et al. | |
| 2002/0144262 A1 | 10/2002 | Plotnick et al. | |
| 2002/0144263 A1 | 10/2002 | Eldering et al. | |
| 2002/0144275 A1 | 10/2002 | Kay et al. | |
| 2002/0147771 A1 | 10/2002 | Traversat et al. | |
| 2002/0152299 A1 | 10/2002 | Traversat et al. | |
| 2002/0154655 A1 | 10/2002 | Gummalla et al. | |
| 2002/0162109 A1 | 10/2002 | Shteyn | |
| 2002/0163928 A1 | 11/2002 | Rudnick et al. | |
| 2002/0166119 A1 | 11/2002 | Cristofalo | |
| 2002/0170057 A1 | 11/2002 | Barrett et al. | |
| 2002/0178447 A1 | 11/2002 | Plotnick et al. | |
| 2002/0196939 A1 | 12/2002 | Unger et al. | |
| 2003/0002862 A1 | 1/2003 | Rodriguez et al. | |
| 2003/0004810 A1 | 1/2003 | Eldering | |
| 2003/0005453 A1 | 1/2003 | Rodriguez et al. | |
| 2003/0007516 A1 | 1/2003 | Abramov et al. | |
| 2003/0014759 A1 | 1/2003 | Van | |
| 2003/0021412 A1 | 1/2003 | Candelore et al. | |
| 2003/0023981 A1 | 1/2003 | Lemmons | |
| 2003/0025832 A1 | 2/2003 | Swart et al. | |
| 2003/0033199 A1 | 2/2003 | Coleman | |
| 2003/0037331 A1 * | 2/2003 | Lee | H04N 7/17336 725/32 |
| 2003/0046704 A1 | 3/2003 | Laksono et al. | |
| 2003/0056217 A1 | 3/2003 | Brooks | |
| 2003/0061619 A1 | 3/2003 | Giammaressi | |
| 2003/0067554 A1 * | 4/2003 | Klarfeld | G11B 27/105 348/461 |
| 2003/0074565 A1 | 4/2003 | Wasilewski et al. | |
| 2003/0077067 A1 | 4/2003 | Wu et al. | |
| 2003/0088876 A1 | 5/2003 | Mao et al. | |
| 2003/0093311 A1 | 5/2003 | Knowlson | |
| 2003/0093784 A1 | 5/2003 | Dimitrova et al. | |
| 2003/0093792 A1 | 5/2003 | Labeeb et al. | |
| 2003/0095791 A1 | 5/2003 | Barton et al. | |
| 2003/0101449 A1 | 5/2003 | Bentolila et al. | |
| 2003/0101451 A1 | 5/2003 | Bentolila et al. | |
| 2003/0110499 A1 | 6/2003 | Knudson et al. | |
| 2003/0115612 A1 | 6/2003 | Mao et al. | |
| 2003/0118014 A1 | 6/2003 | Iyer et al. | |
| 2003/0135860 A1 | 7/2003 | Dureau | |
| 2003/0139980 A1 | 7/2003 | Hamilton | |
| 2003/0140351 A1 | 7/2003 | Hoarty et al. | |
| 2003/0145323 A1 | 7/2003 | Hendricks et al. | |
| 2003/0149975 A1 | 8/2003 | Eldering et al. | |
| 2003/0161473 A1 | 8/2003 | Fransdonk | |
| 2003/0179773 A1 | 9/2003 | Mocek et al. | |
| 2003/0182261 A1 | 9/2003 | Patterson | |
| 2003/0214962 A1 | 11/2003 | Allaye-Chan et al. | |
| 2003/0217365 A1 | 11/2003 | Caputo | |
| 2003/0229681 A1 | 12/2003 | Levitan | |
| 2004/0006625 A1 | 1/2004 | Saha et al. | |
| 2004/0031053 A1 | 2/2004 | Lim et al. | |
| 2004/0045030 A1 | 3/2004 | Reynolds et al. | |
| 2004/0078809 A1 | 4/2004 | Drazin | |
| 2004/0103437 A1 | 5/2004 | Allegrezza et al. | |
| 2004/0109672 A1 | 6/2004 | Kim et al. | |
| 2004/0113936 A1 | 6/2004 | Dempski | |
| 2004/0123313 A1 | 6/2004 | Koo et al. | |
| 2004/0133907 A1 | 7/2004 | Rodriguez et al. | |
| 2004/0146006 A1 | 7/2004 | Jackson | |
| 2004/0158858 A1 * | 8/2004 | Paxton | H04N 7/17336 725/42 |
| 2004/0163109 A1 | 8/2004 | Kang et al. | |
| 2004/0179605 A1 | 9/2004 | Lane | |
| 2004/0181800 A1 | 9/2004 | Rakib et al. | |
| 2004/0187150 A1 | 9/2004 | Gonder et al. | |
| 2004/0187159 A1 | 9/2004 | Gaydos et al. | |
| 2004/0193648 A1 | 9/2004 | Lai et al. | |
| 2004/0193704 A1 | 9/2004 | Smith | |
| 2004/0194134 A1 | 9/2004 | Gunatilake et al. | |
| 2004/0226044 A1 | 11/2004 | Goode | |
| 2004/0261114 A1 | 12/2004 | Addington et al. | |
| 2004/0261116 A1 | 12/2004 | McKeown et al. | |
| 2004/0267965 A1 | 12/2004 | Vasudevan et al. | |

(56) References Cited

U.S. PATENT DOCUMENTS

| | | |
|---|---|---|
| 2005/0010697 A1* | 1/2005 | Kinawi ............ G06F 17/30905 710/1 |
| 2005/0039205 A1 | 2/2005 | Riedl |
| 2005/0039206 A1 | 2/2005 | Opdycke |
| 2005/0041679 A1 | 2/2005 | Weinstein et al. |
| 2005/0047596 A1 | 3/2005 | Suzuki |
| 2005/0050160 A1 | 3/2005 | Upendran et al. |
| 2005/0055685 A1 | 3/2005 | Maynard et al. |
| 2005/0058115 A1 | 3/2005 | Levin et al. |
| 2005/0060742 A1 | 3/2005 | Riedl et al. |
| 2005/0060745 A1 | 3/2005 | Riedl et al. |
| 2005/0060758 A1 | 3/2005 | Park |
| 2005/0071669 A1 | 3/2005 | Medvinsky |
| 2005/0071882 A1 | 3/2005 | Rodriguez et al. |
| 2005/0086691 A1 | 4/2005 | Dudkiewicz et al. |
| 2005/0097598 A1 | 5/2005 | Pedlow et al. |
| 2005/0108529 A1 | 5/2005 | Juneau |
| 2005/0111844 A1 | 5/2005 | Compton et al. |
| 2005/0114141 A1 | 5/2005 | Grody |
| 2005/0114900 A1 | 5/2005 | Ladd et al. |
| 2005/0123001 A1 | 6/2005 | Craven et al. |
| 2005/0125528 A1 | 6/2005 | Burke et al. |
| 2005/0125832 A1 | 6/2005 | Jost et al. |
| 2005/0135476 A1 | 6/2005 | Gentric et al. |
| 2005/0168323 A1 | 8/2005 | Lenoir et al. |
| 2005/0198686 A1 | 9/2005 | Krause et al. |
| 2005/0223409 A1 | 10/2005 | Rautila et al. |
| 2005/0276284 A1* | 12/2005 | Krause ............ H04L 29/06027 370/538 |
| 2005/0289618 A1 | 12/2005 | Hardin |
| 2005/0289619 A1 | 12/2005 | Melby |
| 2006/0010075 A1 | 1/2006 | Wolf |
| 2006/0020984 A1 | 1/2006 | Ban et al. |
| 2006/0036750 A1 | 2/2006 | Ladd et al. |
| 2006/0037060 A1 | 2/2006 | Simms et al. |
| 2006/0047957 A1 | 3/2006 | Helms et al. |
| 2006/0050784 A1 | 3/2006 | Lappalainen et al. |
| 2006/0059098 A1 | 3/2006 | Major et al. |
| 2006/0059342 A1 | 3/2006 | Medvinsky et al. |
| 2006/0062059 A1 | 3/2006 | Smith et al. |
| 2006/0064728 A1 | 3/2006 | Son et al. |
| 2006/0066632 A1 | 3/2006 | Wong et al. |
| 2006/0073843 A1 | 4/2006 | Aerrabotu et al. |
| 2006/0084417 A1 | 4/2006 | Melpignano et al. |
| 2006/0085824 A1 | 4/2006 | Bruck et al. |
| 2006/0088063 A1 | 4/2006 | Hartung et al. |
| 2006/0130107 A1 | 6/2006 | Gonder et al. |
| 2006/0130113 A1* | 6/2006 | Carlucci ............ H04N 7/17318 725/118 |
| 2006/0133398 A1 | 6/2006 | Choi et al. |
| 2006/0133644 A1 | 6/2006 | Wells et al. |
| 2006/0171390 A1 | 8/2006 | La |
| 2006/0171423 A1 | 8/2006 | Helms et al. |
| 2006/0197828 A1 | 9/2006 | Zeng et al. |
| 2006/0218601 A1 | 9/2006 | Michel |
| 2006/0218604 A1 | 9/2006 | Riedl et al. |
| 2006/0248553 A1 | 11/2006 | Mikkelson et al. |
| 2006/0248555 A1 | 11/2006 | Eldering |
| 2006/0253328 A1 | 11/2006 | Kohli et al. |
| 2006/0253864 A1 | 11/2006 | Easty |
| 2006/0256376 A1 | 11/2006 | Hirooka |
| 2006/0271946 A1 | 11/2006 | Woundy et al. |
| 2006/0277569 A1 | 12/2006 | Smith |
| 2006/0291506 A1 | 12/2006 | Cain |
| 2006/0294250 A1 | 12/2006 | Stone et al. |
| 2007/0022459 A1 | 1/2007 | Gaebel et al. |
| 2007/0033531 A1 | 2/2007 | Marsh |
| 2007/0047449 A1 | 3/2007 | Berger et al. |
| 2007/0053293 A1 | 3/2007 | McDonald et al. |
| 2007/0061818 A1 | 3/2007 | Williams et al. |
| 2007/0076728 A1 | 4/2007 | Rieger et al. |
| 2007/0089127 A1 | 4/2007 | Flickinger et al. |
| 2007/0094691 A1 | 4/2007 | Gazdzinski |
| 2007/0101157 A1 | 5/2007 | Faria |
| 2007/0101370 A1 | 5/2007 | Calderwood |
| 2007/0113243 A1 | 5/2007 | Brey |
| 2007/0118852 A1 | 5/2007 | Calderwood |
| 2007/0121569 A1 | 5/2007 | Fukui et al. |
| 2007/0121678 A1 | 5/2007 | Brooks et al. |
| 2007/0124781 A1 | 5/2007 | Casey et al. |
| 2007/0130581 A1 | 6/2007 | Del et al. |
| 2007/0133405 A1 | 6/2007 | Bowra et al. |
| 2007/0153820 A1 | 7/2007 | Gould |
| 2007/0156539 A1 | 7/2007 | Yates |
| 2007/0157234 A1 | 7/2007 | Walker |
| 2007/0162927 A1 | 7/2007 | Ramaswamy et al. |
| 2007/0204300 A1 | 8/2007 | Markley et al. |
| 2007/0204310 A1 | 8/2007 | Hua et al. |
| 2007/0204311 A1 | 8/2007 | Hasek et al. |
| 2007/0204313 A1 | 8/2007 | McEnroe et al. |
| 2007/0204314 A1 | 8/2007 | Hasek et al. |
| 2007/0217436 A1 | 9/2007 | Markley et al. |
| 2007/0223380 A1 | 9/2007 | Gilbert et al. |
| 2007/0233857 A1 | 10/2007 | Cheng et al. |
| 2007/0241176 A1 | 10/2007 | Epstein et al. |
| 2007/0250872 A1 | 10/2007 | Dua |
| 2007/0250880 A1 | 10/2007 | Hainline |
| 2007/0271386 A1 | 11/2007 | Kurihara et al. |
| 2007/0274400 A1 | 11/2007 | Murai et al. |
| 2007/0276926 A1 | 11/2007 | Lajoie et al. |
| 2008/0016526 A1 | 1/2008 | Asmussen |
| 2008/0022012 A1 | 1/2008 | Wang |
| 2008/0052157 A1 | 2/2008 | Kadambi et al. |
| 2008/0066112 A1 | 3/2008 | Bailey et al. |
| 2008/0092181 A1 | 4/2008 | Britt |
| 2008/0098212 A1 | 4/2008 | Helms et al. |
| 2008/0098446 A1 | 4/2008 | Seckin et al. |
| 2008/0101460 A1 | 5/2008 | Rodriguez |
| 2008/0134156 A1 | 6/2008 | Osminer et al. |
| 2008/0134165 A1 | 6/2008 | Anderson et al. |
| 2008/0141175 A1 | 6/2008 | Sarna et al. |
| 2008/0141317 A1 | 6/2008 | Radloff et al. |
| 2008/0152316 A1 | 6/2008 | Sylvain |
| 2008/0155059 A1 | 6/2008 | Hardin et al. |
| 2008/0192820 A1 | 8/2008 | Brooks et al. |
| 2008/0201748 A1 | 8/2008 | Hasek et al. |
| 2008/0229354 A1 | 9/2008 | Morris et al. |
| 2008/0235732 A1* | 9/2008 | Han ................ H04N 5/44543 725/46 |
| 2008/0235746 A1 | 9/2008 | Peters et al. |
| 2008/0244667 A1 | 10/2008 | Osborne |
| 2008/0271068 A1 | 10/2008 | Ou et al. |
| 2008/0273591 A1 | 11/2008 | Brooks et al. |
| 2009/0025027 A1 | 1/2009 | Craner |
| 2009/0028182 A1 | 1/2009 | Brooks et al. |
| 2009/0100459 A1* | 4/2009 | Riedl ................ H04N 21/2385 725/35 |
| 2010/0157928 A1 | 6/2010 | Spinar et al. |
| 2010/0223491 A1 | 9/2010 | Ladd et al. |
| 2011/0162007 A1* | 6/2011 | Karaoguz ...... H04N 21/234318 725/39 |
| 2012/0278841 A1 | 11/2012 | Hasek et al. |
| 2013/0227608 A1 | 8/2013 | Evans et al. |
| 2013/0325870 A1 | 12/2013 | Rouse et al. |
| 2014/0189749 A1* | 7/2014 | Gordon ................ H04N 5/4401 725/54 |

FOREIGN PATENT DOCUMENTS

| | | |
|---|---|---|
| WO | WO-0110125 A1 | 2/2001 |
| WO | WO-0191474 A2 | 11/2001 |
| WO | WO-2004008693 A1 | 1/2004 |

OTHER PUBLICATIONS

Griffith, et al.,Resource Planning and Bandwidth Allocation in Hybrid Fiber-Coax Residential Networks, National Institute of Standards and Technology (NIST), 10 pages, no date.

Kanouff, Communications Technology: Next-Generation Bandwidth Management—The Evolution of the Anything-to-Anywhere Network, 8 pages, Apr. 1, 2004.

(56) References Cited

OTHER PUBLICATIONS

Motorola DOCSIS Cable Module DCM 2000 specifications, 4 pages, no date.
OpenVision Session Resource Manager—Open Standards-Based Solution Optimizes Network Resources by Dynamically Assigning Bandwidth in the Delivery of Digital Services article, 2 pages, (copyright 2006), http://www.imake.com/hopenvision).
Session Resource Manager features and information, 2 pages, no date http://www.imake.com/hopenvision).

* cited by examiner

METHOD AND APPARATUS FOR NETWORK BANDWIDTH CONSERVATION

PRIORITY

This application is a divisional of and claims priority to co-owned and co-pending U.S. patent application Ser. No. 13/346,606 of the same title filed Jan. 9, 2012, and issuing as U.S. Pat. No. 9,300,999 on Mar. 29, 2016, which is a continuation of and claims priority to U.S. patent application Ser. No. 12/231,204 of the same title filed Aug. 28, 2008, issued as U.S. Pat. No. 8,094,656 on Jan. 10, 2012, which is a continuation of and claims priority to U.S. patent application Ser. No. 11/048,348, now U.S. Pat. No. 7,567,565 of the same title, filed Feb. 1, 2005, each of which is incorporated herein by reference in its entirety.

BACKGROUND OF THE INVENTION

1. Field of Invention

The present invention relates generally to the field of network bandwidth utilization, and specifically in one aspect to conserving available bandwidth on the network to support video services (such as high definition or HD video) over a content-based network such as a cable television network.

2. Description of Related Technology

One significant competitive challenge presently faced by network operators relates to managing and conserving bandwidth. This includes the reclamation of otherwise under-utilized or unused bandwidth such that the service and/or customer base can be expanded without significant modifications or build-outs of the underlying network infrastructure. For example, it is clearly desirable to expand the types and availability of "next-generation" network services, including high-definition (HD) broadcast, VOD, high-speed data, VoIP, Interactive TV, etc. over time, without the need for major capital expenditures or system modifications. Hence, network operators are increasingly focused on techniques for "squeezing" as much capacity out of their existing networks as possible.

Driving the foregoing expansion of services are several other related factors, such as the increased adoption of HD televisions by consumers (especially as their price continues to decline), and the increased prevalence of HD content provided by non-cable service providers. Such service providers may comprise, e.g., satellite direct broadcast (DBS) networks, stand-alone HD services such as VOOM$^{sm}$, so-called "over-the-air" HD broadcast systems, and even high-speed Internet Protocol (IP) or similar networks (whether via DSL, cable modem, or otherwise), often referred to as "IPTV". These factors place added emphasis on the cable operator's efficient use their existing infrastructure and its finite bandwidth.

In most cable networks, programs are transmitted using MPEG (e.g., MPEG-2) audio/video compression. Since cable signals are transmitted using Quadrature Amplitude Modulation (QAM) scheme, available payload bitrate for typical modulation rates (QAM-256) used on HFC systems is roughly 38 Mbps. In many deployments, a typical rate of 3.75 Mbps is used to send one video program at resolution and quality equivalent to NTSC broadcast signals. In digital television terminology, this is called Standard Definition (SD) television resolution or service. Therefore, use of MPEG-2 and QAM modulation enables carriage of 10 SD sessions on one RF channel (10×3.75=37.5 Mbps<38 Mbps).

Entertainment-quality transmission of HD signals requires about four times as much bandwidth as SD. For an exemplary MPEG-2 Main Profile—High Level (MP@HL) video compression, each HD program requires approximately 15 Mbps bitrate. Although revenues from HD services and programming may not be four times the revenue from SD service, the ability to offer HD is often critical to cable operators' strategy to be a leader in digital television service offerings.

In the context of a cable network, present day infrastructure provides capacity up to approximately 750 Mhz (with a lesser number of networks being built out to approximately 870 Mhz). As noted above, the bandwidth requirements associated with the aforementioned HD and other next-generation services (even when implementing complementary next-generation video and audio compression algorithms) are very high compared to existing content payloads and services such as standard definition (SD) television.

However, in the short term, even the most optimistic projections for the demand of HD and other such next-generation services would not require all (or even the majority) of the total available capacity of a given infrastructure. Stated differently, many "low-bandwidth", standard definition (SD) users and providers will exist for years to come. For example, most HD content presently offered is restricted to "prime time" programming, as well as certain sporting events, movies, and other specialized programming; this leaves a large pool of non-HD programming which must also be efficiently supported. Hence, one present goal for the MSO is to manage such heterogeneous (i.e., SD and HD) environments as efficiently as possible.

In U. S. cable systems, downstream RF channels used for transmission each occupy a 6 MHz spectral slot in the available bandwidth (i.e., between approximately 54 MHz and 870 MHz). As previously noted, deployments of the next-generation services (e.g., VOD, HD broadcast/simulcast, PVR/DVR) have to share this spectrum with already established analog and digital cable television services including SD broadcasts. For this reason, the exact RF channel used for a given service may differ from plant to plant. However, within a given cable plant, all homes that are electrically connected to the same cable feed running through a neighborhood will receive the same downstream signal. For the purpose of managing services, these homes are grouped into logical aggregations or clusters typically called Service Groups. Homes belonging to the same Service Group receive their services (e.g., broadcast or VOD service) on the same set of RF channels.

Broadcast programs within the cable network may be unicast (i.e., transmitted within a multiplex on one carrier or QAM and an associated program channel), or multicast (i.e., transmitted over two or more QAMs, each associated with a different program channel). During certain periods, an SD version of a program will be broadcast on one channel, and the HD counterpart thereof broadcast a second channel (SD/HD simulcast). During other periods, the SD version of a program will be broadcast on both channels (SD/SD simulcast).

On-demand service such as VOD is typically offered over a given number (e.g., 4) of RF channels from the available spectrum. Thus, an OD Service Group consists of homes receiving OD signals over the same 4 RF channels. Reasons for this grouping include (i) that it lends itself to a desirable "symmetry of two" design of products (e.g. Scientific Atlanta's MQAM), and (ii) a simple mapping from incoming Asynchronous Serial Interface (ASI) payload rate of 213 Mbps to four QAM payload rates.

From the discussion above, the need for allocation of the bandwidth within the network is evident. One such prior art function, called a Service Resource Manager (SRM), is used for allocating bandwidth based on OD session requests. When a new session (e.g., VOD) request is made, the SRM receives that request, allocates bandwidth on a downstream QAM channel, and sends the information back to the CPE that made the request so that it can tune to the right RF channel and the program therein. Since the SRM controls mapping of incoming session requests to QAM channels within the Service Group, it is an appropriate place for a Cable Operator to enforce RF channel usage policy. In general, the SRM should maximize availability of bandwidth to OD and other sessions (by efficiently recycling bandwidth from expired sessions) and by ensuring some level of redundancy in case of equipment failure (e.g. a QAM modulator goes down). The SRM function can be implemented at the edge or core of the network, in a VOD server, or elsewhere. Depending on where this function is implemented, it is variously referred to as NSG (Network Services Gateway) and SRM (Service Resource Manager).

For example, in a Scientific Atlanta network, the VOD server acts as the service resource manager and asks the Digital Network Control System (DNCS) for specific resources. The DNCS responds with a negative or positive response to the request and the VOD server implements the appropriate logic based on the response.

The SeaChange MediaCluster Server device manufactured by SeaChange International Corporation comprises a group of fault-resilient VOD servers connected over a network, in effect acting as one server. See, e.g., U.S. Pat. No. 5,862,312 to Mann, et al. issued Jan. 19, 1999 and entitled "Loosely coupled mass storage computer cluster" and its progeny. The SeaChange apparatus further includes a session resource manager (SRM), and associated connection manager (CM) and streaming service (SS). The CM ostensibly allocates bandwidth, selecting the best network delivery path over which to stream data to the requesting entity. The SS "optimizes" bandwidth and provides some level of fail-over behavior, such that software component failure will not necessarily cause loss or tear-down of the underlying sessions. No functionality relating to the selective conservation of bandwidth based on different service levels (e.g., SD or HD) is provided within this apparatus, however.

While useful for OD session allocation, the SRM function present in modern cable networks does not provide an adequate mechanism to selectively allocate bandwidth (or more importantly conserve bandwidth) for broadcasts based on their service level, e.g., SD or HD. Furthermore, no adequate mechanism for eliminating the redundancy within the aforementioned SD/SD simulcast paradigm is provided by the SRM, or for that matter any other prior art solution.

Various other schemes for resource and bandwidth management within a cable network are known. For example, U.S. Pat. No. 4,521,881 to Stapleford, et al. issued Jun. 4, 1985 and entitled "Data communication system with increased effective bandwidth" discloses a broadband data communication system that provides increased bandwidth for the transmission of electrical information signals over a coaxial cable having main receive and transmit branches, and having drop line pairs connected to the main branches at junction points. A plurality of user devices are connected to each drop line pair, including a particular set connected to a particular pair. Each user device of the set can transmit and receive signals of local frequencies in a selected bandwidth. Frequency isolation means is connected to the particular drop line pair adjacent its junction point, and passes signals of the local frequencies only from the transmit drop line to the receive drop line, while blocking signals of the local frequencies from transmission over the main cable branches. The particular set of user devices and the filter isolation means together define a subnet. Other subnets can use the same bandwidth of local frequencies without interference, thereby increasing the effective bandwidth of the system.

U.S. Pat. No. 5,963,844 to Dail issued Oct. 5, 1999 entitled "Hybrid fiber-coax system having at least one digital fiber node and increased upstream bandwidth" discloses a method and apparatus for increasing upstream bandwidth and reducing ingress noise in a shared hybrid fiber-coax transmission system. The method comprises modulating at least a portion of upstream signals received from subscribers to a high frequency band (e.g., 750-1000 MHz), thereby increasing the upstream bandwidth. The high frequency upstream signals are then digitally regenerated in the coaxial cable plant prior to receipt at a fiber node. At the fiber node, the high-frequency upstream signals are again digitally regenerated and are then transmitted optically in a baseband digital format between the fiber node and a head end. The digital regeneration of the high frequency upstream signals, and the optical transmission of such signals in a baseband digital format reduces the incidence of ingress noise.

U.S. Pat. No. 6,124,878 to Adams, et al. issued Sep. 26, 2000 entitled "Optimum bandwidth utilization in a shared cable system data channel" discloses a full service network (FSN) providing three communication channels that end between a headend and each set-top within the FSN. These channels comprise (1) forward-application-transport (FAT) channels that supply data from the headend to all or to only addressed ones of the set-tops, (2) a forward-data-channel (FDC) that supplies data from the headend to all or to only addressed set-tops, and (3) a reverse-data-channel (RDC) that supplies data from the set-tops to the headend. A fixed bandwidth FDC provides a first bandwidth portion for the high priority transmission of certain types of items at a continuous bit rate (CBR). All other items are transmitted over the FDC using at an available bit rate (ABR). A priority system for the selective transmission of these other items is based upon (1) how full a data buffer for an item is, as compared to a fullness reference, (2) how old the oldest data in the data buffer for the item is, as compared to an age reference. The fullness reference and the age reference are usually different for each of these other data items.

U.S. Pat. No. 6,169,728 to Perreault, et al. issued Jan. 2, 2001 and entitled "Apparatus and method for spectrum management in a multipoint communication system" discloses an apparatus and method for spectrum management in a cable system that controls upstream channel usage for secondary stations transmitting information to a primary station and downstream channel usage for secondary stations receiving information from a primary station. The apparatus and method controls channel load balancing, channel congestion, and channel assignment in the cable system, and controls upstream channels independently from downstream channels. Factors and parameters utilized in such channel control and allocation include error parameters, channel noise parameters, transmit and receive loading factors, and congestion parameters.

U.S. Pat. No. 6,201,901 to Imajima, et al. issued Apr. 3, 2001 and entitled "Video data distributing device by video on demand" discloses a mechanism that determines whether or not the broadcast of a requested video is to be provided in a FVOD or a NVOD service, and if there is any available channel (bandwidth) for the broadcast. If the broadcast has not been switched from the FVOD service to the NVOD service, then a busy state monitoring mechanism checks the number of the current simultaneous subscribers for the video. If the number is equal to or larger than a threshold, then the busy state monitoring mechanism instructs an NVOD service providing mechanism to broadcast the requested video in the NVOD service. If the number is smaller than the threshold, then the busy state monitoring mechanism instructs an FVOD service providing mechanism to broadcast the requested video in the FVOD service.

United States Patent Publication No. 20020095684 to St. John, et al. published Jul. 18, 2002 end entitled "Methods, systems and computer program products for bandwidth allocation based on throughput guarantees" discloses methods, systems and computer programs for controlling access to a shared communication medium such as a cable network utilizing a revolving priority queue. The revolving priority queue (RPQ) is divided into at least a low priority tier having a plurality of request queues and a high priority tier having a plurality of request queues. A request is directed into an initial queue in the high priority tier if throughput for an end user associated with the request fails to meet a guaranteed throughput. Furthermore, bandwidth may be allocated based on an order in which requests are read from the RPQ, where requests are read from the high priority tier before requests are read from the low priority tier of queues. Additional system embodiments are provided which may be used for requests or for packet-based bandwidth allocation.

United States Patent Publication No. 20020154655 to Gummalla, et al. published Oct. 24, 2002 entitled "System and method for combining requests for data bandwidth by a data provider for transmission of data over an asynchronous communication medium" discloses a method and system for combing requests for data bandwidth by a data provider for transmission of data over an asynchronous communication. A headend receives one or more bandwidths requests from one or more cable modems via upstream communication. A scheduler then combines one or more bandwidths requests from the same cable modem to create a single data burst bandwidth. The headend then grants the data burst bandwidth to the appropriate cable modem via downstream communication.

United States Patent Publication No. 20030140351 to Hoarty, et al. published Jul. 24, 2003 entitled "Cable television system compatible bandwidth upgrade using embedded digital channels" discloses apparatus, methods, and systems for providing an increase in the effective bandwidth of a cable television distribution plant in a manner compatible with most common cable television systems. By using methods and systems for simultaneously transmitting a standard analog television signal and a digital data signal in a manner that minimizes interference of each with the other, one or more data carriers may be embedded within one or more analog television channels in accordance with various aspects of the present invention. These combined signals can be transmitted over the existing cable television distribution plant to a location at or near the subscribers so that, among other things, that the subscriber may "pause and resume" much in the way Personal Video Recorders work.

Various approaches to upstream signaling for session establishment and channel change within a network are also known in the art. For example, U.S. Pat. No. 6,742,187 to Vogel issued May 25, 2004 and entitled "Upstream bandwidth allocation map (MAP)-initiated channel change method for data-over-cable systems" discloses a method by which an upstream channel change for a cable modem in a data-over-cable system is achieved via an upstream bandwidth allocation map message sent from a cable modem termination system to cable modems, instead of requiring an exchange of upstream channel change request and reply messages. The result is that the upstream channel change can be made essentially immediately, in a deterministic fashion. As such, the upstream channel change method is particularly useful for time-sensitive applications, such as Internet telephony, VoIP, and Internet video on demand services. Load balancing can also be achieved more efficiently.

United States Patent Publication No. 20040163109 to Kang, et al. published Aug. 19, 2004 and entitled "Method for controlling network digital broadcasting service and system therefore" discloses a method of servicing requests associated with the broadcasting of SD (Standard) level and HD (High Definition) level content over a network (e.g., a Digital Subscriber Line). The method comprises providing a direct request (control message) to a digital broadcast server from a client device for a session connection, and establishing a session by receiving a confirmation from the digital broadcasting server. This approach bypasses the SRM (i.e., is direct between the client device and server), thereby ostensibly streamlining the process. Also, a server for a channel change can be requested directly from the client device, the channel change being completed by receiving a confirmation from the server. Other direct client-server requests and confirmations include messages for checking the status of the client device, and for session termination.

While the prior art referenced above (including the SRM function) has generally identified the need for bandwidth management functions and upstream or reverse channel signaling, it fails to provide any apparatus or method that optimizes or conserves bandwidth when both next-generation (e.g., HD) and current generation (e.g., SD) content are present, especially in the instance of SD/SD and SD/HD simulcasts. Furthermore, the prior art SRMs and algorithms are not flexible with regard to allowing selective implementation of one or more business policies with the network, or even within a single local service area or group, and do not leverage efficiencies relating to "switched digital" channel bandwidth allocation for purposes of creating real time HD broadcast sessions.

Hence, based on the foregoing, there is a distinct need for improved apparatus and methods that permit the efficient use and conservation of available bandwidth on content-based networks, such that varying degrees of both present-generation (e.g., SD) and -next generation (e.g., HD) services can be easily and reliably provided to the largest possible customer base. Such improved apparatus and methods would ideally (i) be implemented with only minimal modification to the existing infrastructure, (ii) allow for longer-term migration to different service mixtures (e.g., increased use of HD, VOD, and similar services over time), and (iii) allow for dynamic variation of the mixture of services as a function of one or more parameters such as time of day, service area, service class, etc., including for example leveraging a "switched digital" system architecture for broadcasting HD content. Mechanisms to implement different types of operational and/or business rules would also be provided.

SUMMARY OF THE INVENTION

The present invention satisfies the foregoing needs by providing improved apparatus and methods for network bandwidth conservation and optimization, such as may be used in a cable or satellite network.

In a first aspect of the invention, an improved method of operating a network carrying information to a plurality of users at a first service level is disclosed. In one embodiment, the service level comprises a standard definition (SD) encoding, and the method comprises: scheduling the information at the first service level onto first and second user channels of the network simultaneously, at least the first user channel having a first physical channel associated therewith; defining a relationship between the first physical channel and the second user channel; and selectively tuning at least one of the users to only the first physical channel in response to the at least one user attempting to tune to either of the first and second user channels based at least in part on the relationship. This approach allows for significant conservation of bandwidth on the network during simulcast operations, since only one physical channel (and one broadcast of the SD content) is required to service both program channels.

In a second aspect of the invention, an improved method of operating CPE within a content-based network is disclosed. In one embodiment, the method comprises: receiving a plurality of scheduling information regarding programming to be broadcast, the information identifying a first period when the programming is scheduled substantially simultaneously on first and second program channels; receiving, during the first period, user commands to tune to the first or second program channels; and selectively tuning, based at least in part on the information, to a first physical channel irrespective of whether the user commands the CPE to tune to the first or the second channel.

In another embodiment, the method comprises: receiving a plurality of mapping information during a first period when programming is scheduled substantially simultaneously on first and second program channels, the mapping information relating the first and second program channels to a first physical channel; receiving, during the first period, user commands to tune to the first or second program channels; and selectively tuning, based at least in part on the information, to the first physical channel regardless of whether the user commands the CPE to tune to the first or the second program channel.

In a third aspect of the invention, improved CPE for use in a cable network is disclosed. In one embodiment, the CPE comprises: an interface configured to receive encoded content signals from the network; processing apparatus operatively coupled to the interface and adapted to decode the encoded signals received via the interface; and at least one computer program running on the CPE, the at least one program being adapted to: receive a plurality of mapping data during a first period when programming is scheduled substantially simultaneously on first and second program channels of the network, the mapping data relating the first and second program channels to a first physical channel; receive, during the first period, user commands to tune to the first or second program channels; and selectively cause tuning of the interface, based at least in part on the data, to the first physical channel regardless of whether the user commands request tuning to the first or the second program channel.

In a second embodiment, the CPE comprises: an interface configured to receive content signals encoded according to a first service level, and also encoded according to a second service level, from the network; processing apparatus operatively coupled to the interface and adapted to decode the encoded content signals received via the interface; and at least one computer program running on the CPE, the at least one program being adapted to: utilize first data relating to a first period when the content signals encoded according to the first level are scheduled substantially simultaneously on first and second program channels of the network, the first data relating the first and second program channels to a first physical channel; and utilize second data relating to a second period when the content signals encoded according to the first level are scheduled on the first program channel substantially simultaneously with the content signals encoded according to the second level scheduled on the second program channel, the second data relating the second program channel to a second physical channel.

In a fourth aspect of the invention, improved network apparatus for use in a cable network having a plurality of CPE is disclosed. In one embodiment, the apparatus comprises: an interface configured to receive signals from at least one of the CPE; processing apparatus operatively coupled to the interface and adapted to process the signals received via the interface; and at least one computer program, the at least one program being adapted to: receive, via the interface and from the at least one CPE, first signals requesting tuning to a first program channel; assign at least one physical channel to the request; and transmit second signals to the at least one CPE to permit the CPE to tune to the at least one physical channel.

In a fifth aspect of the invention, a method of assigning physical channels within a cable network is disclosed. In one embodiment, the method comprises: operating a first physical channel, the operating comprising broadcasting standard definition (SD) programming over the physical channel; receiving a request to view complementary high definition (HD) programming; and based at least in part on the request, assigning a second physical channel for broadcast of the HD programming.

In a sixth aspect of the invention, a method of operating a cable network carrying content encoded according to first and second service levels (e.g., SD and HD, respectively) to a plurality of CPE operatively coupled to the network is disclosed. In one embodiment, the method comprises: scheduling the content encoded at the first service level onto first and second user channels of the network, the first and second user channels having first and second physical channels associated therewith, respectively; broadcasting the content encoded according to the first service level on both the first and second physical channels simultaneously, for a first period; broadcasting the content encoded according to the first service level on the first physical channel, and the content encoded according to the second service level on the second physical channel, simultaneously, for a second period; selectively tuning at least one of the CPE to only the first physical channel in response to a user of the at least one CPE attempting to tune to either of the first and second user channels during the first period; and selectively tuning the at least one CPE to the second physical channel during the second period.

In a seventh aspect of the invention, a method of doing business within a cable network is disclosed. In one embodiment, the method comprises: offering at least one program at a first service level during a first period on a plurality of program channels; and offering the at least one program at a first service level on a first of the plurality of program channels, and at a second service level on a second of the plurality of program channels, during a second period; wherein access to the second program channel during the second period is restricted to only a subset of the users within the network. In one variant, the first and second service levels comprise SD and HD encoded content, respectively, and access to the second program channel is based on a given user's subscription level.

In an eighth aspect of the invention, a method of bandwidth management in a content delivery network having a plurality of client devices is disclosed. In one embodiment, the method includes: (i) identifying a first and a second program content associated with a session and being delivered to at least one of the plurality of client devices, the first and second program content being provided sequentially and separated by one or more short duration events; (ii) evaluating one or more criteria associated with the at least one of the plurality of client devices to determine an likelihood of the at least one of the plurality of client devices continuing to require the session for viewing of the second program content upon completion of the first program content; and (iii) based at least in part on the evaluation, determining whether to tear down the session after completion of the first program content.

In a ninth aspect of the invention, a computer readable apparatus is disclosed. In one embodiment, the computer readable apparatus comprises a medium adapted to store a computer program, the computer program configured to when executed: (i) identify a first and a second program content associated with a session and configured to be delivered to at least one of the plurality of client device, the first and second program content configured to be provided sequentially and separated by one or more short-duration events; (ii) evaluate one or more criteria associated with the at least one of the plurality of client devices to determine an expectation of the at least one of the plurality of client devices that continue to require the session to view the second program content upon completion of the first program content; and (iii) based at least in part on the evaluation, implement computerized logic. In a further embodiment, the computerized logic comprises: (i) determining whether to disestablish the session at least after completion of the first program content; and (ii) when the determination indicates that the session should be disestablished at least after the completion of the first program content, causing disestablishment of the session.

In a tenth aspect of the invention, a network apparatus configured for use within a network having a plurality of client devices associated therewith is disclosed. In one embodiment, the apparatus comprises (i) one or more interfaces, the interfaces configured to provide first and second content streams to the plurality client devices via the network; (ii) a storage entity configured to store at least one computer program thereon; and (iii) a processing logic. In one implementation, the processing logic is operative to: (i) receive a channel switching pattern associated with an individual one of the plurality of client devices; (ii) evaluate the channel switching pattern by use of the at least one computer program; and (iii) based at least on the evaluation, optimize the provision of the first and second content streams. The optimization, in one implementation, may comprise one or more of: (i) a set-up of the first content streams, and (ii) a tear down the second content streams.

These and other aspects of the invention shall become apparent when considered in light of the disclosure provided below.

DETAILED DESCRIPTION OF THE INVENTION

Figure 1:
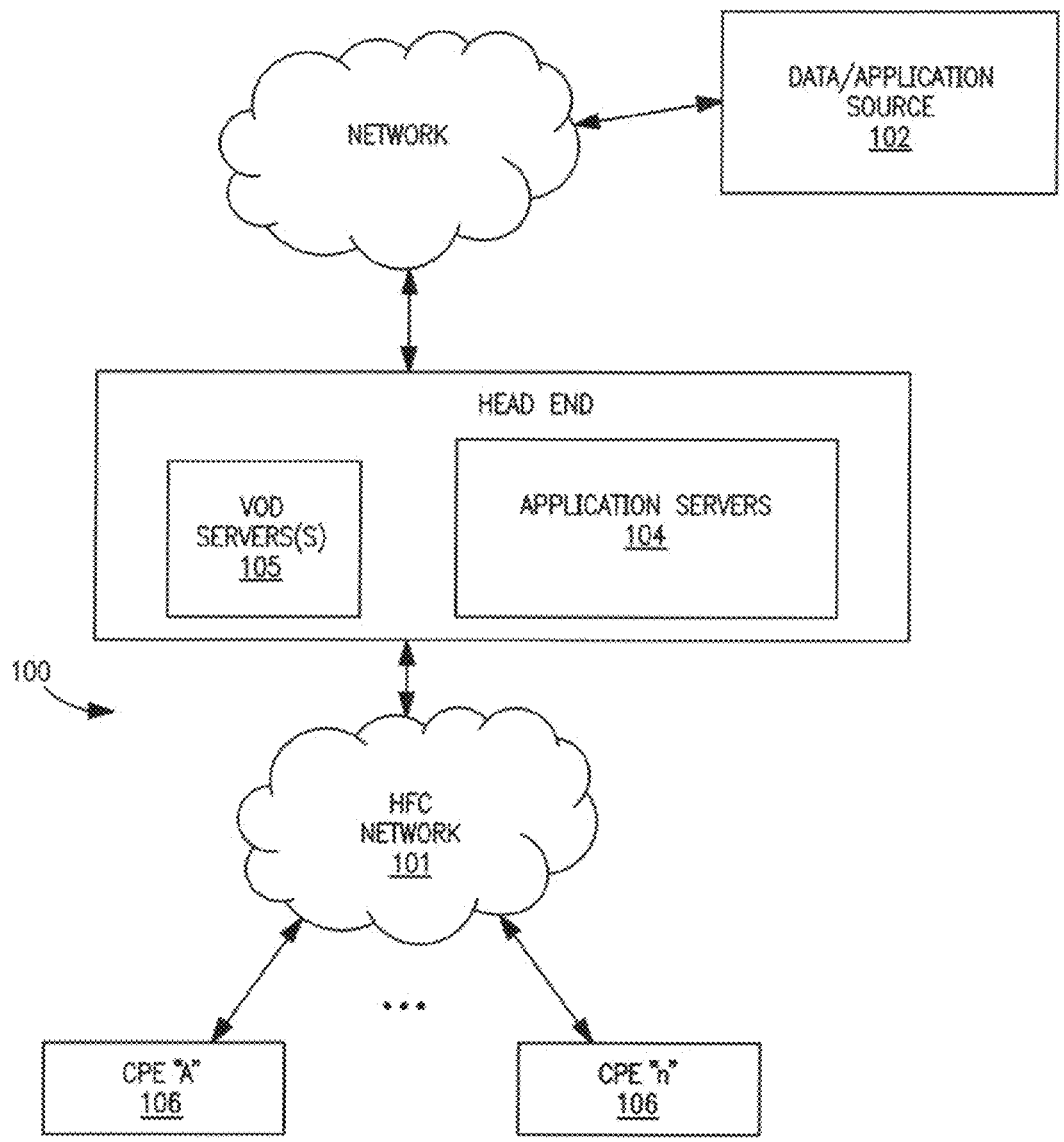
FIG. 1 is a functional block diagram illustrating an exemplary HFC cable network configuration useful with the present invention.

Reference is now made to the drawings wherein like numerals refer to like parts throughout.

As used herein, the terms "user channel" and "program channel" are all generally synonymous with the concept of a perceived stream of information. For example, a program/user channel might comprise "Channel 3" which carries the content of a given network (e.g., NBC). This is to be distinguished from a physical channel, which is used to physically carry and distribute the content, which may for example comprise one or more QAMs within a given portion of the RF spectrum of a cable system.

As used herein, the term "QAM" refers to modulation schemes used for sending signals over cable networks. Such modulation scheme might use any constellation level (e.g. QAM-16, QAM-64, QAM-256 etc.) depending on details of a cable network. A QAM may also refer to a physical channel modulated according to said schemes.

As used herein, the term "Service Group" refers to either a group of service users (e.g. subscribers) or the resources shared by them in the form of entire cable RF signal, only the RF channels used to receive the service or otherwise treated as a single logical unit by the network for resource assignment.

As used herein, the terms "MSO" or "multiple systems operator" refer to a cable, satellite, or terrestrial network provider having infrastructure required to deliver services including programming and data over those mediums.

As used herein, the terms "network" and "bearer network" refer generally to any type of telecommunications or data network including, without limitation, hybrid fiber coax (HFC) networks, satellite networks, telco networks, and data networks (including MANs, WANs, LANs, WLANs, internets, and intranets). Such networks or portions thereof may utilize any one or more different topologies (e.g., ring, bus, star, loop, etc.), transmission media (e.g., wired/RF cable, RF wireless, millimeter wave, optical, etc.) and/or communications or networking protocols (e.g., SONET, DOCSIS, IEEE Std. 802.3, ATM, X.25, Frame Relay, 3GPP, 3GPP2, WAP, SIP, UDP, FTP, RTP/RTCP, H.323, etc.).

As used herein, the term "head-end" refers generally to a networked system controlled by an operator (e.g., an MSO) that distributes programming to MSO clientele using client devices. Such programming may include literally any information source/receiver including, inter alia, free-to-air TV channels, pay TV channels, interactive TV, and the Internet. DSTBs may literally take on any configuration, and can be retail devices meaning that consumers may or may not obtain their DSTBs from the MSO exclusively. Accordingly, it is anticipated that MSO networks may have client devices from multiple vendors, and these client devices will have widely varying hardware capabilities. Multiple regional head-ends may be in the same or different cities. As used herein, the terms "client device" and "end user device" include, but are not limited to, personal computers (PCs) and minicomputers, whether desktop, laptop, or otherwise, set-top boxes such as the Motorola DCT2XXX/5XXX and Scientific Atlanta Explorer 2XXX/3XXX/4XXX/8XXX series digital devices, personal digital assistants (PDAs) such as the Apple Newton®, "Palm®" family of devices, handheld computers, personal communicators such as the Motorola Accompli or V710, J2ME equipped devices, cellular telephones, wireless nodes, or literally any other device capable of interchanging data with a network.

Similarly, the terms "Customer Premises Equipment (CPE)" and "host device" refer to any type of electronic equipment located within a customer's or user's premises and connected to a network. The term "host device" refers generally to a terminal device that has access to digital television content via a satellite, cable, or terrestrial network. The host device functionality may be integrated into a digital television (DTV) set. The term "customer premises equipment" (CPE) includes such electronic equipment such as set-top boxes, televisions, Digital Video Recorders (DVR), gateway storage devices (Furnace), and ITV Personal Computers.

As used herein, the term "network agent" refers to any network entity (whether software, firmware, and/or hardware based) adapted to perform one or more specific purposes. For example, a network agent may comprise a computer program running in server belonging to a network operator, which is in communication with one or more processes on a CPE or other device.

As used herein, the term "application" refers generally to a unit of executable software that implements a certain functionality or theme. The themes of applications vary broadly across any number of disciplines and functions (such as on-demand content management, e-commerce transactions, brokerage transactions, home entertainment, calculator etc.), and one application may have more than one theme. The unit of executable software generally runs in a predetermined environment; for example, the unit could comprise a downloadable Java Xlet™ that runs within the JavaTV™ environment.

As used herein, the term "computer program" is meant to include any sequence or human or machine cognizable steps which perform a function. Such program may be rendered in virtually any programming language or environment including, for example, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ (including J2ME, Java Beans, etc.) and the like.

The term "component" in the context of software refers generally to a unit or portion of executable software that is based on a related set of functionalities. For example, a component could be a single class in Java™ or C++. Similarly, the term "module" refers generally to a loosely coupled yet functionally related set of components.

As used herein, the term "server" refers to any computerized component, system or entity regardless of form which is adapted to provide data, files, applications, content, or other services to one or more other devices or entities on a computer network.

Overview

The present invention discloses methods and apparatus for conserving bandwidth on, e.g., a cable TV or other content-based network. The invention provides efficiencies to the network operator by taking advantage of the fact that most programming (for most of the typical broadcast day and available channels) will be in an SD or other lower-bandwidth format. For example, a given movie may be broadcast on user or program Channel X in its analog or digital SD form, with an SD simulcast on program Channel Y during parts of the day, and an HD simulcast on program Channel Y during other parts of the day (e.g., "prime time"). However, until the prime time or other designated HD broadcast slot is reached, the HD simulcast on Channel Y will simply comprise the same SD content available on Channel X. Thus by mapping the user's Channel Y to the QAM channel for Channel X, the network operator conserves "multicast" bandwidth associated with the SD content for a significant fraction (often the majority) of the programming day.

The foregoing approach provides additional benefits and efficiencies, particularly when combined with a "switched digital" architecture; i.e., one where a given service (level) is selectively provided to a local node or service area when demanded. Specifically, in one exemplary embodiment, the program stream is only instantiated for delivery to the relevant local node ad hoc; i.e., when a subscriber serviced by that node of the network attempts to tune to a particular program channel (e.g., Channel Y in the above example). This is somewhat akin to set-up of a conventional VOD session, yet without any real-time "trick mode" functionality. When the request for the program Channel Y is made, bandwidth for the broadcast session is assigned, and an OOB message or other communication is sent from the servicing entity (or head-end) to the requesting CPE so that the CPE knows the PID/QAM channel to which it must tune in order to receive and decode the Channel Y content. When other subscribers in the common service node/area desire to watch Channel Y, the servicing entity or head-end instructs their respective CPE to join the active broadcast of that program channel at the appointed tuner coordinates (e.g., PID/TSID/QAM).

In addition to SD and HD, other service levels (and types of services) can be used as the basis of the conservation management algorithms described herein. For example, VOD or IPTV (Internet Protocol television) capability can be scheduled into a slot, such as during a promotional period, and the multicast bandwidth conserved until the scheduled slot begins, at which point any users tuning to the program channel having the VOD or IPTV service scheduled will instantiate a new session and physical channel assignment as previously described.

Improved network and CPE apparatus capable of implementing the aforementioned conservation methodologies are also described, as well as mechanisms to implement operational and/or business rules during conservation management.

Detailed Description of Exemplary Embodiments

Exemplary embodiments of the apparatus and methods of the present invention are now described in detail. While these exemplary embodiments are described in the context of the aforementioned hybrid fiber coax (HFC) cable architecture having an multiple systems operator (MSO), digital networking capability, and plurality of client devices/CPE, the general principles and advantages of the invention may be extended to other types of networks and architectures where bandwidth conservation is required or desirable, whether broadband, narrowband, wired or wireless, content or data, or otherwise. Hence, the following description is merely exemplary in nature. For example, the invention may be practiced over a fiber-to-the-home (FTTH) or fiber-to-the-curb (FTTC) system or over future satellite or millimeter wave-based network having two-way capabilities similar to today's digital cable HFC networks.

It will also be appreciated that while described generally in the context of a network providing service to a customer or consumer (i.e., residential) end user domain, the present invention may be readily adapted to other types of environments including, e.g., commercial/enterprise, and government/military applications. Myriad other applications are possible.

It is also noted that while the following discussion is cast primarily in terms of two service levels (i.e., SD and HD), the methods and apparatus disclosed herein can be extended to other numbers and types of service levels. For example, it is foreseeable that yet even higher levels of definition may be employed in the future (e.g., "ultra-high definition" or UHD), thereby allowing intelligent bandwidth conservation between three service levels (SD, HD, and UHD). As another option, multiple levels or rates may be present with one of the aforementioned service levels, such as where the SD level includes levels SD1, SD2, . . . SDn, and/or the HD level similarly includes HD1, HD2, . . . HDn, with each of these sub-levels having different data rates and/or other characteristics. Alternatively, bandwidth conservation according to the present invention may be performed not based on definition level (data rate), but some other attribute such as for example the selective availability of a type of service (e.g., OD, IPTV, or DVR/PVR). Various alternate conservation schemes are described subsequently herein in greater detail.

It is further noted that while described primarily in the context of 6 MHz RF channels, the present invention is applicable to literally any frequency/bandwidth, such as for example 8 MHz channels. Furthermore, as referenced above, the invention is in no way limited to traditional cable system frequencies (i.e., below 1 GHz), and in fact may be used with systems that operate above 1 GHz band in center frequency or bandwidth, to include without limitation so-called ultra-wideband systems.

FIG. 1 illustrates a typical content-based network configuration with which the bandwidth conservation methodology of the present invention may be used. The various components of the network 100 include (i) one or more data and application origination points 102; (ii) one or more application distribution servers 104; (iii) one or more VOD servers 105, and (iv) consumer premises equipment (CPE) 106. The distribution server(s) 104, VOD servers 105 and CPE(s) 106 are connected via a bearer (e.g., HFC) network 101. A simple architecture comprising one of each of the aforementioned components 102, 104, 105, 106 is shown in FIG. 1 for simplicity, although it will be recognized that comparable architectures with multiple origination points, distribution servers, VOD servers, and/or CPE devices (as well as different network topologies) may be utilized consistent with the invention. For example, the head-end architecture of FIG. 1a (described in greater detail below) may be used.

The data/application origination point 102 comprises any medium that allows data and/or applications (such as a VOD-based or "Watch TV" application) to be transferred to a distribution server 104. This can include for example a third party data source, application vendor website, CD-ROM, external network interface, mass storage device (e.g., RAID system), etc. Such transference may be automatic, initiated upon the occurrence of one or more specified events (such as the receipt of a request packet or ACK), performed manually, or accomplished in any number of other modes readily recognized by those of ordinary skill.

The application distribution server 104 comprises a computer system where such applications can enter the network system. Distribution servers are well known in the networking arts, and accordingly not described further herein.

The VOD server 105 comprises a computer system where on-demand content can be received from one or more of the aforementioned data sources 102 and enter the network system. These servers may generate the content locally, or alternatively act as a gateway or intermediary from a distant source.

The CPE 106 includes any equipment in the "customers' premises" (or other locations, whether local or remote to the distribution server 104) that can be accessed by a distribution server 104. Such CPEs 106 comprise processors and associated computer memory adapted to store and run the downloaded or resident application, as well as receive the streamed in-band content. For example, "Watch TV" or similar applications or their components (or updates thereto) of the type described subsequently herein with reference to FIG. 6 can be downloaded to the CPE as required. For example, co-owned U.S. patent application Ser. No. 10/655,655 filed Sep. 5, 2003, and entitled "Technique For Updating A Resident Application And Associated Parameters In A User Terminal Through A Communications Network", and issued as U.S. Pat. No. 7,500,235 on Mar. 3, 2009, incorporated herein by reference in its entirety, describes one exemplary technique and architecture for updating applications resident on network CPE.

Figure 1A:
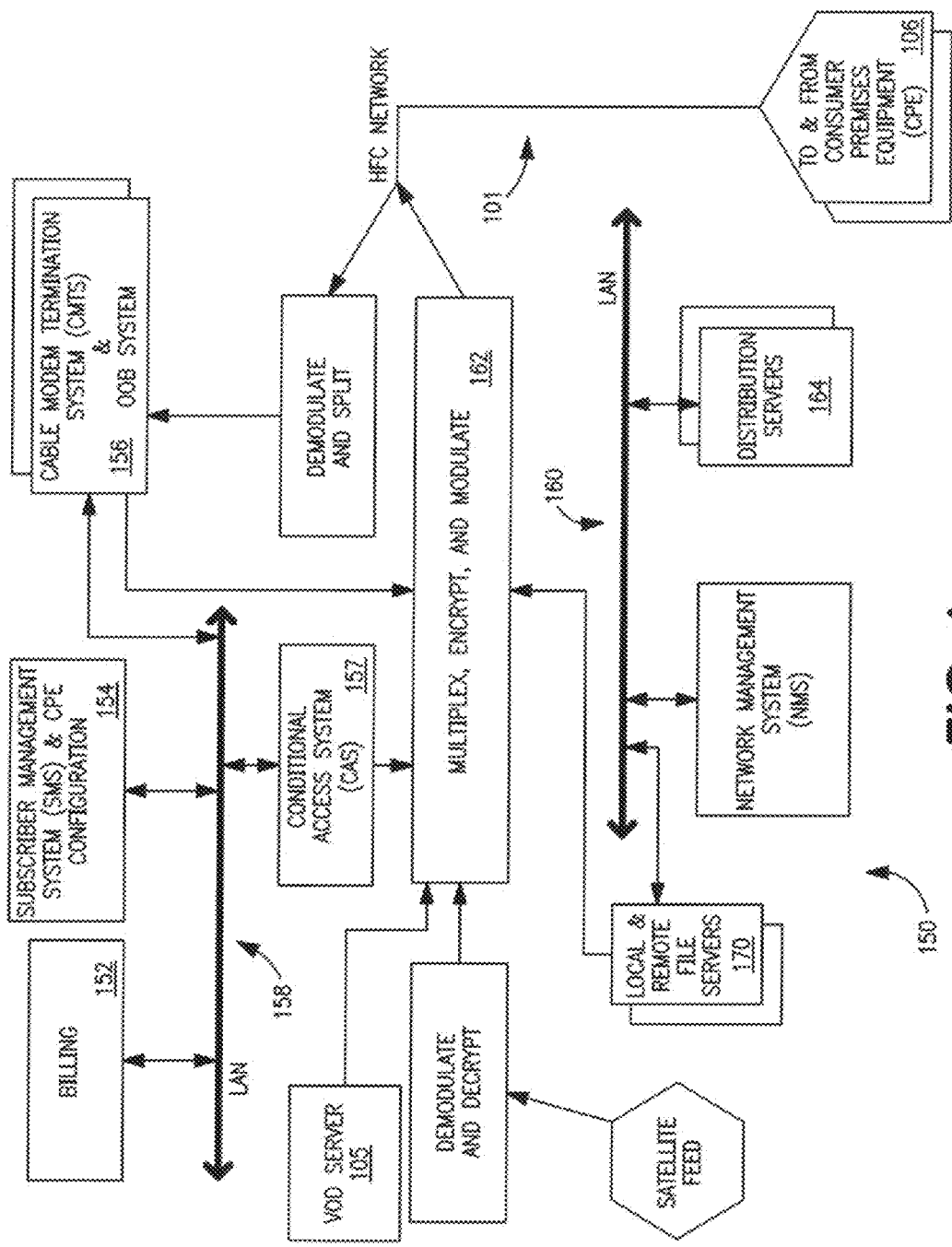
FIG. 1a is a functional block diagram illustrating one exemplary HFC cable network head-end configuration useful with the present invention.

Referring now to FIG. 1a, one exemplary embodiment of a head-end architecture useful with the present invention is described. As shown in FIG. 1a, the head-end architecture 150 comprises typical head-end components and services including billing module 152, subscriber management system (SMS) and CPE configuration management module 154, cable-modem termination system (CMTS) and OOB system 156, as well as LAN(s) 158, 160 placing the various components in data communication with one another. It will be appreciated that while a bar or bus LAN topology is illustrated, any number of other arrangements as previously referenced (e.g., ring, star, etc.) may be used consistent with the invention. It will also be appreciated that the head-end configuration depicted in FIG. 1a is high-level, conceptual architecture and that each MSO may have multiple head-ends deployed using custom architectures.

The architecture 150 of FIG. 1a further includes a multiplexer/encrypter/modulator (MEM) 162 coupled to the HFC network 101 adapted to "condition" content for transmission over the network. The distribution servers 104 are coupled to the LAN 160, which provides access to the MEM 162 and network 101 via one or more file servers 170. The VOD servers 105 are coupled to the LAN 160 as well, although other architectures may be employed (such as for example where the VOD servers are associated with a core switching device such as an 802.3z Gigabit Ethernet device). As previously described, information is carried across multiple channels. Thus, the head-end must be adapted to acquire the information for the carried channels from various sources. Typically, the channels being delivered from the head-end 150 to the CPE 106 ("downstream") are multiplexed together in the head-end and sent to neighborhood hubs (FIG. 1*b*) via a variety of interposed network components.

Content (e.g., audio, video, etc.) is provided in each downstream (in-band) channel associated with the relevant service group. To communicate with the head-end, the CPE 106 may use the out-of-band (OOB) or DOCSIS channels and associated protocols. The OCAP 1.0 (and subsequent) specification provides for exemplary networking protocols both downstream and upstream.

In another embodiment, the network infrastructure includes one or more on-demand file or "carousel" functions. The present invention contemplates that not only will more traditional movie (e.g., MPEG) broadcast data be delivered though the bandwidth conservation mechanisms described herein, but also data for interactive applications or other types of applications. For example, in a manner not unlike existing approaches to ordering an on-demand (OD) movie, an application would request data, images, links, audio files, video files, and the like in an on-demand fashion. Hence, the OD downstream service can be considered a third and separate level of service (i.e., SD, HD, and OD), or alternatively can be considered as one or more subclasses within the existing levels; i.e., where HD includes HD-OD. This concept is described in greater detail below with respect to the switched digital architecture embodiments. Myriad other organization schemes are also possible.

It will also be recognized that the multiple servers (broadcast, VOD, or otherwise) can be used, and disposed at two or more different locations if desired, such as being part of different server "farms". These multiple servers can be used to feed one service group, or alternatively different service groups. In a simple architecture, a single server is used to feed one or more service groups. In another variant, multiple servers located at the same location are used to feed one or more service groups. In yet another variant, multiple servers disposed at different location are used to feed one or more service groups. One exemplary multi-server architecture particularly useful with the present invention is described in co-pending and co-owned United States Patent Application Publication No. 20020059619 to Lebar published May 16, 2002, entitled "Hybrid central/distributed VOD system with tiered content structure", and issued as U.S. Pat. No. 7,690,020 on Mar. 30, 2010, which is incorporated herein by reference in its entirety.

Figure 1B:
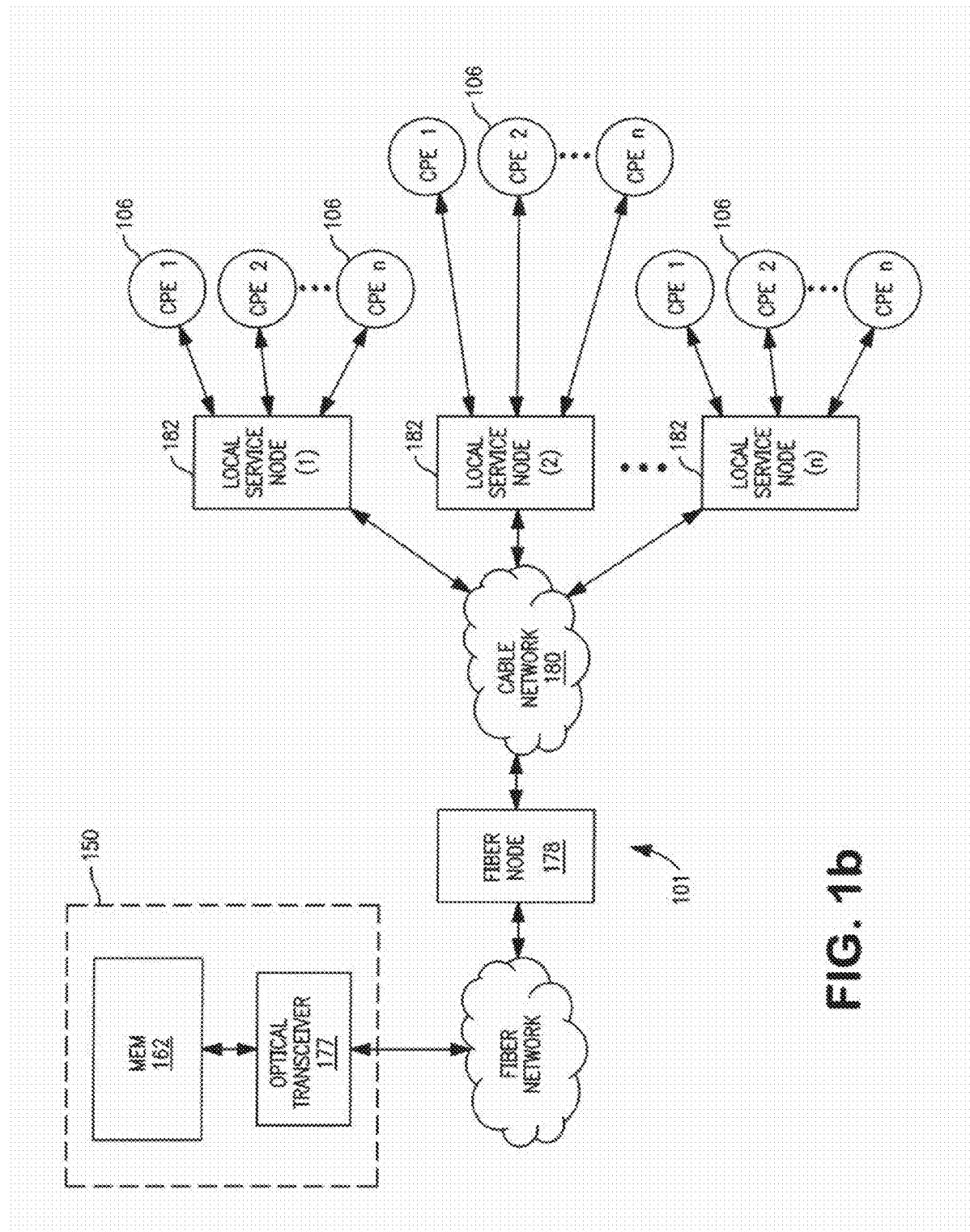
FIG. 1b is a functional block diagram illustrating one exemplary local service node configuration useful with the present invention.

FIG. 1*b* illustrates an exemplary "switched" network architecture useful with the present invention. Specifically, as shown in FIG. 1*b*, the network 101 of FIGS. 1 and 1*a* comprises a fiber/coax arrangement wherein the output of the MEM 162 of FIG. 1*a* is transferred to the optical domain (such as via an optical transceiver 177 at the head-end or further downstream). The optical domain signals are then distributed to a fiber node 178, which further distributes the signals over a distribution network 180 to a plurality of local servicing nodes 182. This provides an effective 1:N expansion of the network at the local service end, thereby leveraging the benefits provided by the conservation techniques described subsequently herein.

Many other permutations of the foregoing system components and communication methods may also be used consistent with the present invention, as will be recognized by those of ordinary skill in the field.

Bandwidth Conservation Methods

Figure 2:
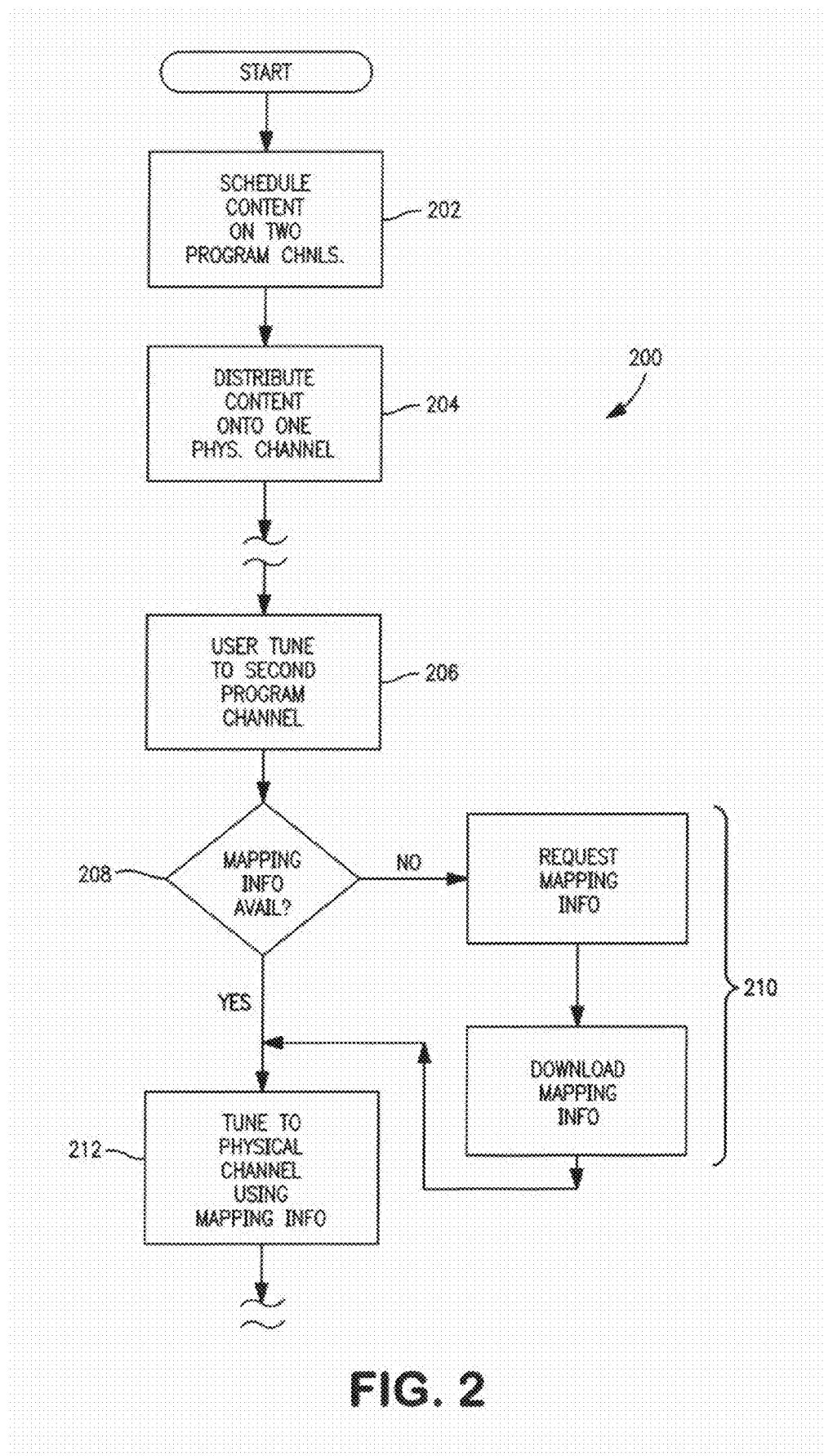
FIG. 2 is a logical flowchart illustrating a first embodiment of the bandwidth conservation methodology according to the present invention, wherein a single level of service is provided.
Figure 3A:
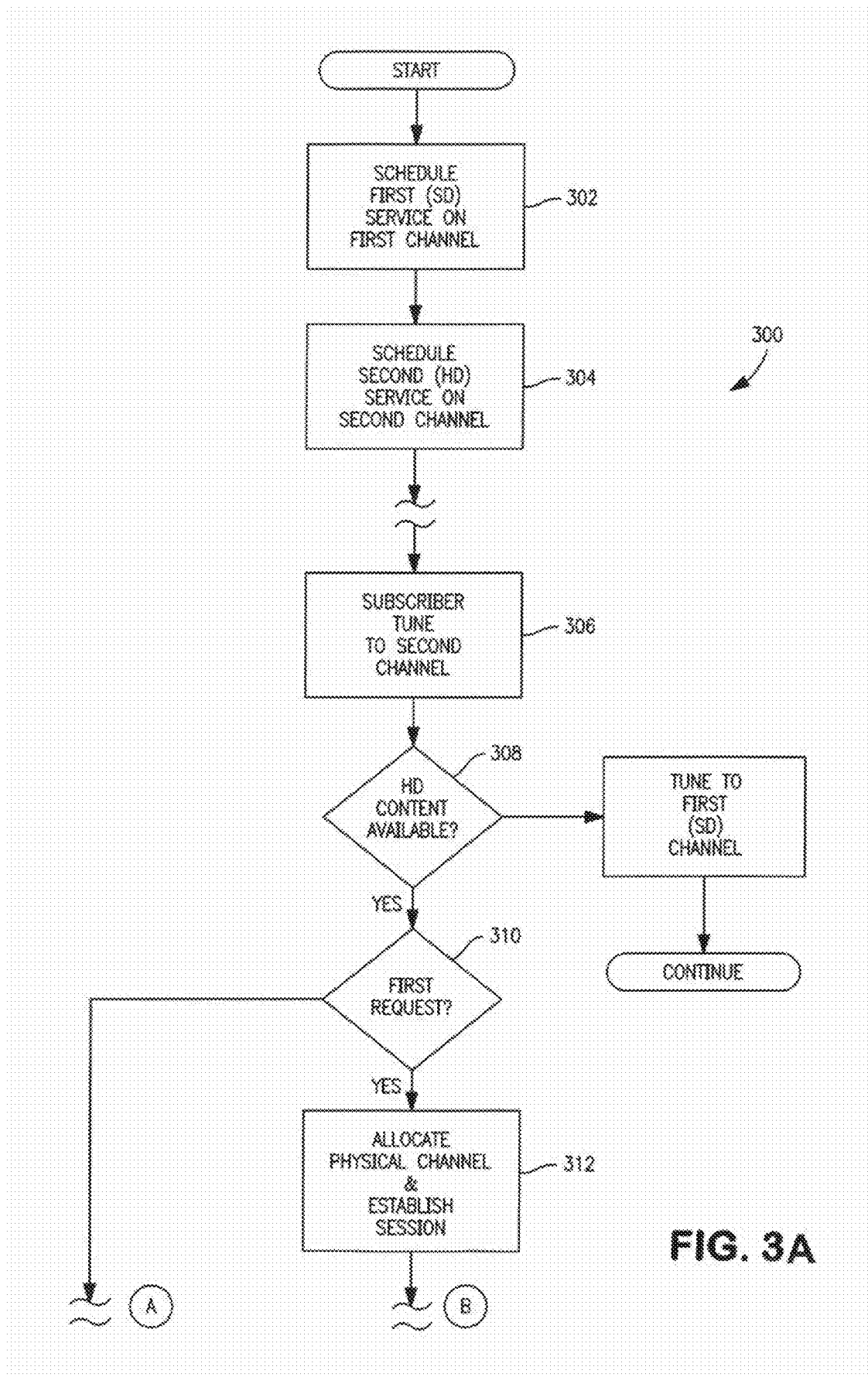
FIGS. 3A-3B is a logical flowchart illustrating a second embodiment of the bandwidth conservation methodology according to the present invention, wherein multiple service levels are provided.
Figure 3B:
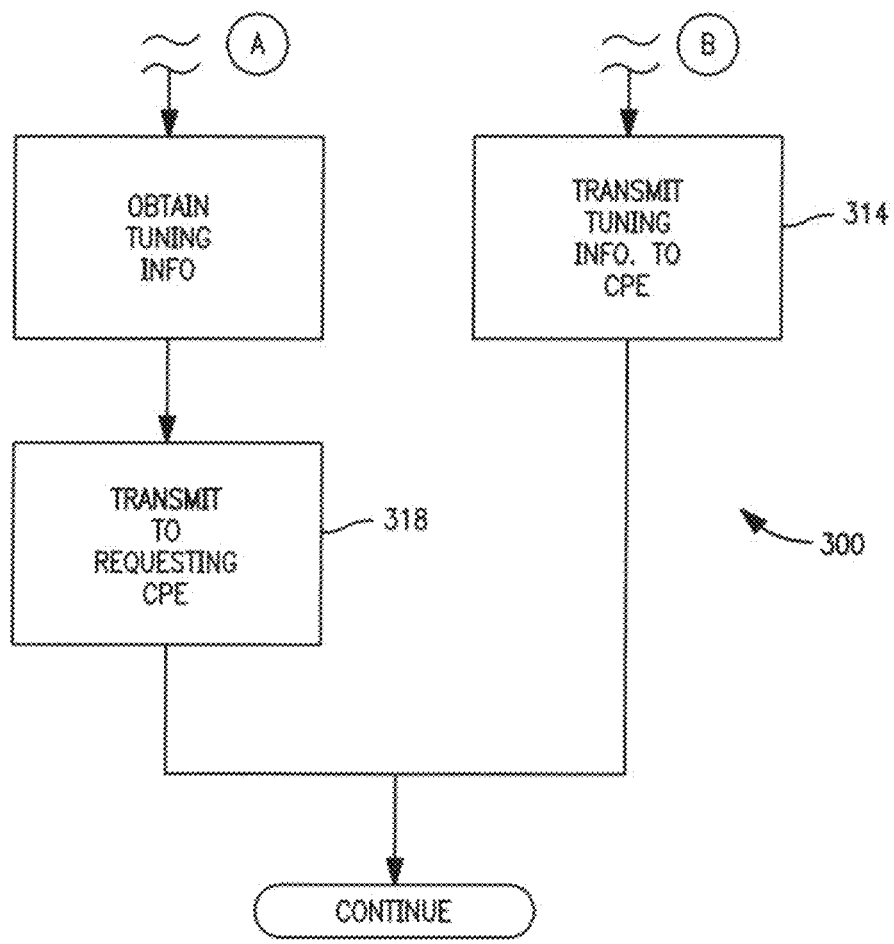

Referring now to FIGS. 2 and 3A-3B, exemplary methods for conserving bandwidth in a content-based network are described in detail.

As previously referenced, the present invention advantageously provides efficiencies to the network operator by taking advantage of the fact that most programming (for most of the typical broadcast day and available channels) will be in an SD or other lower-bandwidth format. For example, a given video program may be scheduled on program Channel X in its analog or digital SD form, with an HD simulcast on program Channel Y. Table 1 illustrates this relationship graphically:

TABLE 1

| Program (User) | Local Time | | |
|---|---|---|---|
| Channel | 6 pm | 7 pm | 8 pm |
| X | SD | SD | SD |
| Y (Simulcast of X) | SD | SD | HD |

X and Y may also be related or constrained by some logical condition or functional relationship, such as e.g., where Y=X+N, N being an integer.

However, as is frequently the case, until the "prime time" or other designated broadcast slot is reached, the HD simulcast on Channel Y may simply comprise the same SD content available on Channel X. Thus by mapping the user's Channel Y to the QAM (physical channel) for user Channel X, the network operator conserves multicast bandwidth associated with the SD content for the majority of the day.

FIG. 2 graphically illustrates a generalized embodiment of the methodology described above. Specifically, the method 200 comprises first scheduling content of a first service level (e.g., SD) on first and second user channels per step 202. It is noted that step 202 merely schedules the content, as opposed to actually distributing the content on any physical channel or group of channels.

Next, the content of the first service level (e.g., SD) is distributed onto a first physical channel (e.g., one or more QAMs) per step 204.

The user of a given CPE thereafter tunes to the second channel, looking for the scheduled SD content per step 206. The tuning application (e.g., Watch TV or the like) resident on the CPE 106 then accesses mapping information received from the head-end or servicing node, or requests it (step 208). If required, the servicing node responds with the mapping information (step 210), and the CPE subsequently employs the accessed or received mapping information to tune the CPE tuner to the first physical channel per step 212. Accordingly, the user believes that they have tuned to a second or discrete channel, when in fact they have tuned to the same physical channel as if they had selected the first user channel.

The mapping of the second user channel to the first physical channel can be accomplished in any number of different ways, including mapping of a particular program ID (PID) (and transport stream ID or TSID as required) to one or more QAM tuners within the CPE 106.

The foregoing method 200 advantageously conserves significant bandwidth, since the MSO or network operator need only utilize one physical channel to provide viewers with multiple "simulcast" program channels. This is particularly important when multiple levels of service (e.g., SD and HD) are scheduled onto one of the two user channels, the presence of the HD programming requiring a second physical channel due to increased bandwidth requirements. Specifically, during those periods when both user channels have SD programming scheduled (e.g., on a weekday afternoon, or very early in the morning), the second physical channel is not required, and hence the two user channels can be serviced by a single physical channel (and the reduced bandwidth requirements associated therewith), the second user channel being mapped exclusively to the first user/physical channel during such periods.

Hence, in the exemplary embodiment of the invention, the channel mapping for a given user Channel Y will depend on whether the content is a simulcast in SD format of the content shown on user Channel X (this may be determined based on information as simple as the time of day and the user Channel number), and will be implemented by the Watch TV or other application using (i) information contained in a dedicated broadcast to the CPE 106 from the head-end or servicing node 182 or its proxy (e.g., additional information sent on the OOB carousel); (ii) contained in an electronic program guide (EPG) received at the CPE 106; (ii) metadata or other information delivered in-band; and/or (iv) any combination thereof.

During those periods where the HD service is scheduled onto the second UI channel, there is a need to have two or more distinct physical channels due to, inter alia, the higher bandwidth requirements of the HD encoded content. The second physical channel(s) can be either one already established and presently unutilized, or alternatively established ad hoc, such as by simply allocating the HD content to one or more QAMs at the time the HD programming is to begin, and instructing the user's CPE to tune to a different QAM/set via the aforementioned downstream OOB mapping communications. Regardless of how it is established, the different QAM/set is thereby available for other uses when not carrying the HD content, such as e.g., carrying other SD programming or providing OD or DVR/PVR capacity.

It will also be recognized that the methodology 200 of FIG. 2 can be practiced on a network where the second physical channel is not broadcast, but rather established as a function of other events, including e.g., a user or CPE-initiated pull or request. Such intelligent channel mapping provides additional benefits and efficiencies, particularly when combined with a "switched digital" paradigm. Co-owned U.S. patent application Ser. No. 09/956,688 filed Sep. 20, 2001, entitled "Technique For Effectively Providing Program Material In A Cable Television System", issued as U.S. Pat. No. 8,713,623 on Apr. 29, 2014, incorporated herein by reference in its entirety, describes one exemplary switched architecture useful with the present invention. The basic underlying premise of such switched architectures is that the differentiated (e.g., HD) content is not transmitted or broadcast onto the network (or to the local node or entity servicing a given CPE) until there is a valid request to view the HD content. Such request may comprise, for example, a given user's CPE tuning to the UI channel carrying the HD content, or another signal from the CPE to the head-end or other servicing network entity. In this fashion, the bandwidth of the network is conserved, since programming broadcasts or transmissions that no one is watching are obviated.

The switched digital approach is further leveraged through the use of a distributed network architecture; i.e., the use of a plurality of local nodes or servicing entities such as that shown in FIG. 1b. Consider the hypothetical case of where no local nodes are used, and hence all CPE are functionally coupled to a single node (e.g., the head-end). Under the aforementioned switched digital approach, the first viewer desiring to view the HD content would cause an HD broadcast session to be initiated, with the content being broadcast to the entire network. This is inefficient from a bandwidth conservation standpoint, since a significant amount of the bandwidth of the entire network is used to service as little as one viewer.

Conversely, in the limiting case where each separate premises had its own dedicated local servicing node (and QAMs), each of these nodes could switch the HD broadcast on/off locally, thereby not affecting the operation of the rest of the network. Additional bandwidth for the selected channel would only be required within the distribution path from the head-end to that particular servicing node.

As can be appreciated, practical implementations of the switched digital concept will reside somewhere between these two extremes; i.e., with the network having a plurality of local nodes, each node servicing a plurality of CPE/premises. It will also be appreciated that the term "local" as used herein need not refer exclusively to a geographic or spatial frame of reference, but may also comprise partitioning in a logical sense, such as where one node services a group of customers who are logically proximate (e.g., based on service plan, demographics, viewing habits, OD consumption patterns, etc.).

FIGS. 3A-3B illustrate one exemplary embodiment of the method of bandwidth conservation using a switched approach. As in the method 200 described above, the method 300 of FIG. 3A-3B comprise the MSO or operator scheduling a first level of service on a first user channel (step 302). Additionally, a second level of service (e.g., HD) is scheduled onto a second user channel (step 304). Once a subscriber "tunes" to the user channel carrying the HD content (step 306), and it is determined that (i) the HD content is available (step 308), and (ii) the present request is the first request within the relevant network, e.g., within the CPE serviced by that particular local service node (step 310), an HD session is established (step 312), and the tuning (mapping) information is sent to the requesting subscriber's CPE 106 per step 314. Additionally, the tuning information can be sent to all (or a subset of the) other CPE within the original requesting subscriber's service node per step 314, so that these other "secondary" users can utilize the established switched digital broadcast of the HD content.

Where it is determined that another CPE within the relevant "network" has already been assigned a physical channel for the selected program channel per step 310, the channel tuning information for the already-assigned physical channel is passed to the requesting CPE per step 318. Note that this information may have already been passed to the requesting CPE when the earlier user established the channel, and can also be used to obviate much of the method of FIGS. 3A-3B (i.e., the determination of the availability of the content per step 308, the first request determination, and the establishment of the session and physical channel per step 312); see FIG. 3C.

Unlike the channel mapping supporting the "broadcast" methodology of FIG. 2, the foregoing channel mapping of the physical channel (e.g., QAM PID) to a user channel in the switched architecture (FIGS. 3A-3B) is necessarily dynamic. Specifically, depending on when the initial user selects a given program, and what service area/node they are associated with, the channel mapping will be varied as compared to that which might occur at another time/node. For example, the first demanded HD session in a given service node might be allocated QAM number A if initiated at a first point in time, while the same request might be allocated QAM number C if initiated at another time, due to the possibility that other users in the service group may be allocated a given set of QAMs for, e.g., a VOD session or the like. The first HD user in the service node in effect anchors the channel allocation for subsequent HD users of that same user channel in the same service node, the allocation (mapping) being sent to each of the secondary users (or a subset thereof as desired) after the first user's session is established as described above. This process is conducted within the framework of other channel allocations existing within the local service area at the time of the first HD session request; i.e., the HD session establishment process of FIGS. 3A-3B will not allocate a QAM or set of QAMs that are already in use within that area.

Figure 3C:
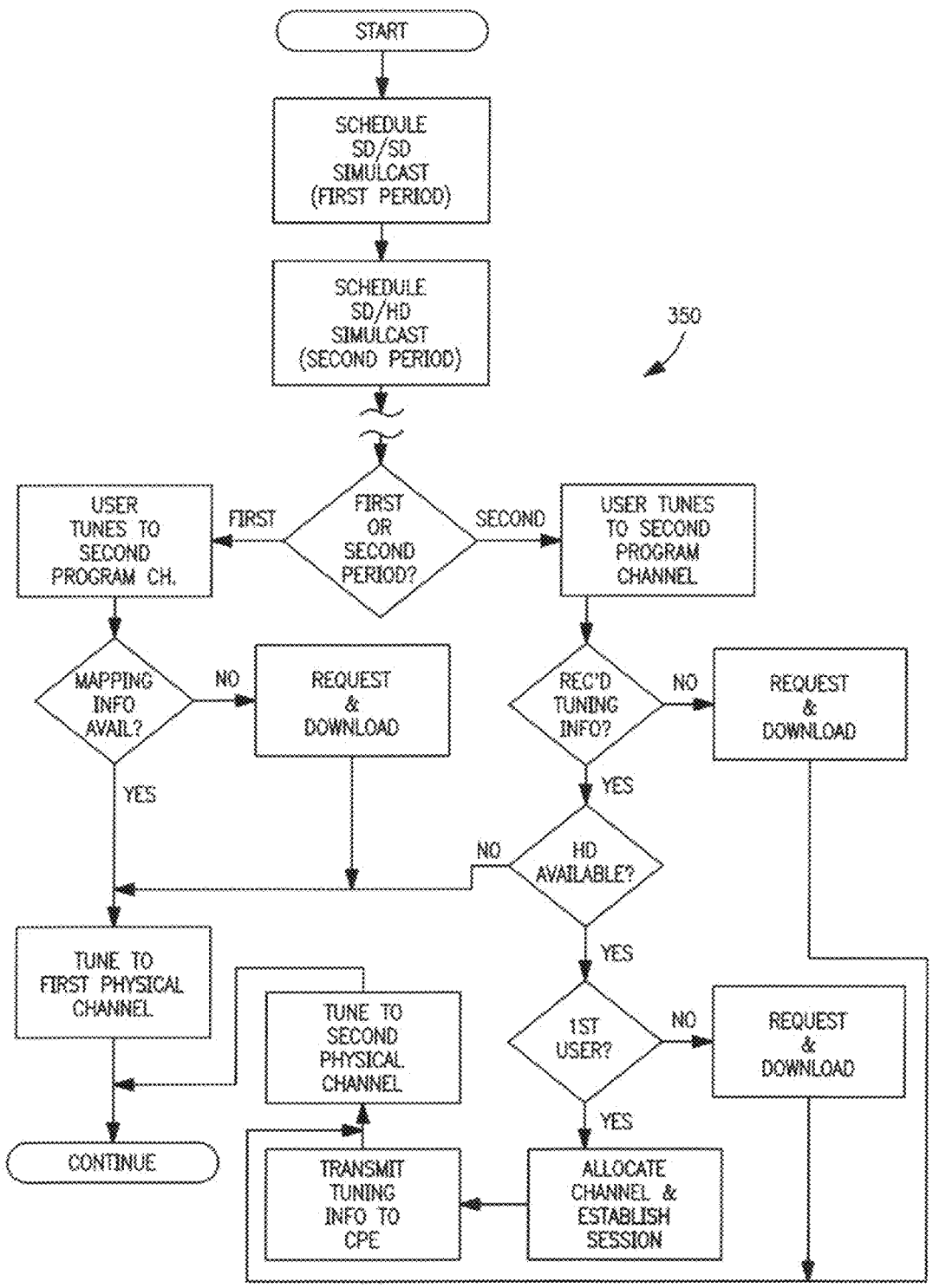
FIG. 3C is a logical flow diagram on an exemplary software process implementing the methodologies of both FIGS. 2 and 3A-3B.

FIG. 3C illustrates one exemplary method 350 combining the methods of FIGS. 2 and 3A-3B; i.e., to provide both bandwidth conservation of bandwidth during SD/SD simulcast periods and "on-demand" like session establishment during SD/HD simulcast periods.

The foregoing functionality of FIGS. 2 and 3A-3B may be accomplished using any number of different hardware/firmware/software configurations. For example, in one embodiment of the invention, the CPE is provided with a resident or downloaded application (e.g. "Watch TV" or similar) which receives channel mapping information from, e.g., the DNCS (Digital Network Control System) at the head-end or other node of the network. The DNCS or other node provides the CPE with PID tuning information when user Channel Y is chosen, thereby mapping the user's Channel Y to user Channel X (and its associated physical channel) during those times when only a first level (e.g., SD) of programming is available on Channel Y. This mapping advantageously obviates the simulcasting of the SD content on a second physical channel, thereby conserving bandwidth within the available QAMs.

Alternatively, it may be desirable to dispose the channel mapping function at a node more local to the user(s) as compared to the head-end, since this approach acts to both (i) distribute the overhead associated with receiving, processing, and providing the necessary channel mapping information to a plurality of nodes, and (ii) place the responding node closer to the requesting user, thereby reducing communication channel overhead back to the head-end. These "local" responding nodes may be integrated into the local service nodes 182 of FIG. 1b, and comprise e.g., a server with distributed software process(es), which may also be in communication with the head-end for administrative functions as well as coordinating and updating the channel allocation scheme and related functions (see FIG. 4, discussed subsequently herein).

It will further be appreciated that one or more indirect sources may be used to provide the aforementioned mapping information, whether through interfacing directly with the CPE, or indirectly through another network agent. For example, a proxy network entity (e.g., remote server) can be used to provide the mapping information via an IP connection (over the cable network or otherwise) to the CPE after the CPE transmits the channel tuning request upstream to the local service node (or the head-end). Alternatively, a wireless interface to the CPE (such as via an 802.11 WLAN, 802.16 WiMax, or even 802.15 PAN interface) can be used to deliver the mapping information. A satellite link may also be used to provide the mapping information directly to a satellite receiver integrated into or in communication with the CPE 106.

Furthermore, "pre-positioned" information may be used for mapping, such as where one or more predetermined mapping tables or other information constructs are stored within the CPE 106 (or a connected device, such as an IEEE-1394 appliance), and recalled based on, e.g., information transmitted via the OOB or other link described above. For example, in one variant of the invention, the CPE is loaded with a plurality of mapping tables during initial installation, or activation of a "premium" service plan or other feature/service. The individual tables are identified by one or more coded parameters, and each contain a mapping scheme which can be used by the resident "Watch TV" or similar application on the CPE. Upon receipt of the coded parameters (such as via the aforementioned OOB downstream channel), the CPE recalls the designated table, and applies the appropriate mapping contained therein. This approach obviates the need to download all of the mapping information, thereby reducing the overhead on the downstream channel used to transfer the mapping information (here, just the coded parameters). It will be appreciated, however, that in order to use this approach with the dynamic user channel/QAM allocation of the switched digital approach described above (FIGS. 3A-3B), a scheme must be implemented wherein the channel allocations occurring at the local service node (or head-end) are conducted according to a prescribed pattern or template which corresponds to one of the tables accessible to the CPE.

Similarly, another variant of the invention uses an algorithm or predetermined characteristics to spontaneously generate a mapping between channels. This algorithm is resident on both the CPE and the servicing entity (head-end, local node, etc.), and is coordinated such that the servicing entity passes a key or "seed" to the algorithm on the CPE. The seed is used by the algorithm to generate the required mapping according to the predetermined characteristics of the algorithm. As a simple example, consider the case where the mapping algorithm dictates that an established "simulcast" channel will always be mapped to the original or base physical channel according to the formula of Eqn. (1):

$$Y=X+N \qquad \text{Eqn. (1)}$$

Accordingly, the CPE programmed with this relationship need only know the value of X (or Y) to determine the mapping relationship. If the head-end or other servicing network entity transmits the value of X or Y to the CPE, the CPE can apply the same algorithm to derive the appropriate channel mapping. This approach can be used for both the SD/SD mapping functions (FIG. 2) and the SD/HD functions (FIGS. 3A-3B) as desired. In the case of SD/SD mapping, the algorithm might know that user Channel X and simulcast user Channel Y are always separated by 100 (e.g., X=7, Y=107, N=100), and hence when mapping user Channel Y to the physical carrier of user Channel X, it need merely take the value of Y (107), subtract 100, and then apply the existing user-to-physical channel mapping of the result (i.e., 7).

Obviously, more sophisticated (and even dynamic) mapping algorithms may be utilized consistent with the invention, including those that are non-linear, or even deterministic based on other parameters such as time of day, information resident on an electronic program guide (EPG) distributed to the CPE 106, operational conditions including equipment failure or maintenance, etc. For example, one approach would be to apply a first algorithm such as that of Eqn. (1) above to a first range of user channels, a second algorithm to a second range, and so forth. In one such scheme, base or original user Channels 1-10 could map to simulcast user Channels 101-110, while base Channels 11-20 could map to simulcast Channels 151-160. In a "maintenance mode", Channels 11-20 might map to simulcast Channels 211-220. Myriad other such schemes will be appreciated by those of ordinary skill provided the present disclosure.

Using the foregoing approach, a user's tuning to the simulcast channel (say user Channel 151) would automatically be mapped by their CPE 106 to the relevant base channel (i.e., user Channel 11) and its corresponding physical channel seamlessly when no HD content was present. Alternatively, when HD content was available, the method of FIGS. 3A-3B would be invoked by the CPE to both request and establish the "anchor" channel for the HD session, and ultimately inform other CPE in the local node of the mapping information between the channel and the selected QAM(s).

It will be appreciated that other schemes may also be used for storing and retrieving the mapping information, such as providing the information encoded or contained within an in-band transport stream (TS) that is already being delivered to the premises requesting the new channel. Hence, where the customer is viewing user Channel A, and wishes to switch to Channel Y (the otherwise simulcast version of Channel X), the CPE signals the head-end (such as via existing upstream OOB signaling mechanisms) that a change to a "mapped" channel is requested, and the head-end or other node responds with mapping information, such as a mapping table or coded parameters as described above) which are included within the TS carrying Channel A. The mapping information or parameters are retrieved from the decoded TS, and immediately applied by the resident application and CPE tuner stages to tune the CPE to the physical channel(s) associated with user Channel X (even though user Channel Y was selected). In the event that the user is switching to a user channel scheduled to be carrying HD, the methodology of FIGS. 3A-3B is then invoked, with the tuning of the CPE being conducted according to PID/TSID/QAM or other similar information contained within the encoded transport stream carrying user Channel A.

It will further be recognized that the mapping of channels may occur on a non-exclusive basis, such as where content is broadcast or otherwise provided over a base channel and simulcast on a plurality of other channels. In the context of the foregoing example, such a mapping might comprise base user Channel X being mapped to user Channels $Y_1$ and $Y_2$. This might be the case where a given SD program is distributed on a first channel and simulcast on more than one other channel. Thus, the user's CPE according to the present invention would map selection of either Channel $Y_1$ or $Y_2$ to Channel X. This situation would provide yet further leverage to the MSO or network operator, since two simulcast channels could be "collapsed" in favor of the base channel of the same service level.

In one exemplary embodiment of the invention, the times and service level of various programming is made available to the "Watch TV" or other resident application of the CPE via programming metadata of the type well known in the art, e.g., similar to that made available to populate the CPE's electronic programming guide (EPG). Generally speaking, "metadata" comprises extra data not typically found in (or at least not visible to the users of) the network. This metadata may be validated against relevant specifications if desired, such as those provided by CableLabs. The metadata might specify the date, GMT or other start time reference, duration, service level (e.g., SD or HD), and PID/TSID/QAM channel(s), and can be rendered in human-readable form if desired. It will be recognized that additional and/or different metadata content may be used consistent with the invention. The metadata information can be packaged in a prescribed format such as a markup language (e.g., XML). The metadata (files) may also be encrypted; encryption algorithm information of the type well known in the art may also be included.

Metadata may also be used for conveying and formatting upstream data and requests, such as that sent by the Watch TV or other CPE application upstream to the head-end servers or servicing network entities. This information might include, e.g., CPE or customer identifying information, CPE profile data, maintenance and error-related data, etc.

Similarly, data on the user's channel switching patterns can be collected and sent upstream; e.g., where the CPE applications logs the user's channel changing patterns during simulcast periods in order to feed a head-end database or algorithm which can attempt to optimize one or more aspects of its own operation based on the data. Such optimization might comprise, e.g., delaying the tearing down of existing program streams, or setup of new streams at a particular local node, where the user's anecdotal upstream metadata indicates that they are a rapid "channel hopper".

The process of establishing or tearing down user-initiated sessions according to the invention can be made as prompt or latent as desired. For example, in one embodiment, the program table or schedule for a given user channel is evaluated by an algorithm running on the CPE 106 (e.g., as part of the modified Watch TV application described elsewhere herein, or as a stand-alone process) to identify substantially contiguous HD programs that may be separated only by short duration events such as advertisements, promotions, introductions, etc. In this fashion, rapid collapse of the HD session upon the completion of a first HD program (and subsequent switching to a mapped SD simulcast) when no other local users are viewing can be selectively avoided if desired, possibly based on the expectation that the viewer will continue watching the second HD program. Alternatively, where maximal bandwidth conservation is desired, the sessions can be made to collapse immediately, thereby freeing as much bandwidth as possible at all times. Such immediate collapse might also be driven in part by anecdotal or statistical data indicating that, e.g., this user or users in general, respectively, tend not to watch two HD programs in sequence, tend not to watch two programs of the given genre in sequence, and so forth. Myriad different criteria for determining whether or not to rapidly tear down a given session will be recognized by those of ordinary skill given the present disclosure.

The bandwidth conservation mechanisms described herein may also be used with other bandwidth allocation and optimization mechanisms. For example, the methods and apparatus described in co-owned U.S. patent application Ser. No. 10/881,979 filed Jun. 29, 2004, entitled "METHOD AND APPARATUS FOR NETWORK BANDWIDTH ALLOCATION", and issued as U.S. Pat. No. 8,843,978 on Sep. 23, 2014, incorporated herein by reference in its entirety, may be used to provide enhanced allocation of bandwidth between SD and HD sessions across multiple physical channels (QAMs) or even logical channels within the network. The allocation mechanisms and schemes can be forwarded downstream, for example, to the servicing nodes 182 and the CPE 106 via an OOB channel or other means, such that each device knows the scheduling of SD and HD programs on the various different sets of QAMs.

Also, the physical channels provided by the bearer network can be comprised of a plurality of constituent channels, as is described in co-owned U.S. patent application Ser. No. 11/013,671 filed Dec. 15, 2004, entitled "Method And Apparatus For Wideband Distribution Of Content", and issued as U.S. Pat. No. 9,723,267 on Aug. 1, 2017, incorporated herein by reference in its entirety. For example, the content of a given TS can be multiplexed across a plurality of physical carriers using a wideband approach. The multiplexed signal is reassembled at the CPE 106 using a wideband tuner (or a plurality of related tuners) and information from the head-end as to the multiplexing scheme and channels used. Hence, for the purposes of the present invention, the aggregation of multiplexed channels acts like a single QAM.

Software Architecture

Figure 4:
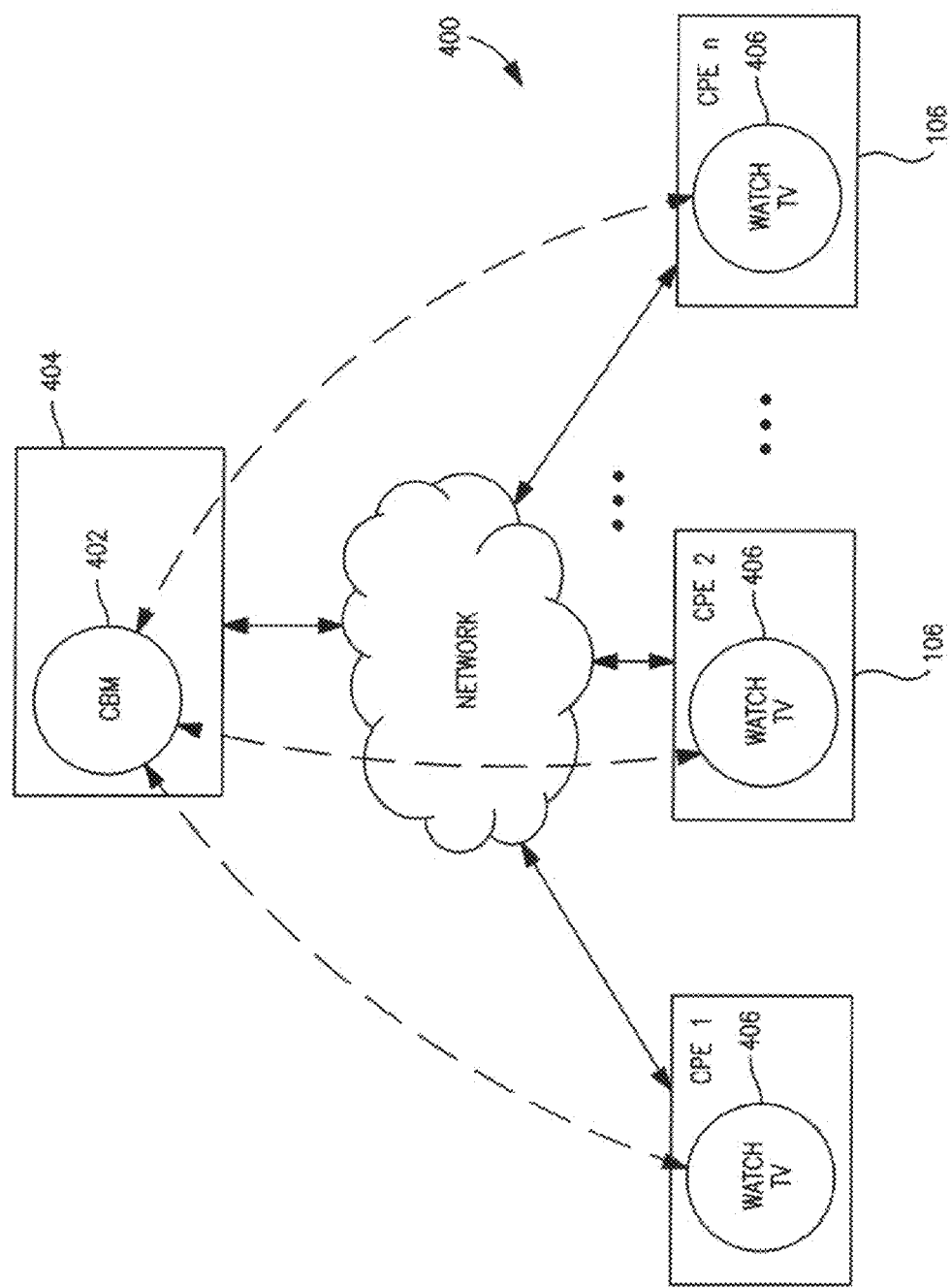
FIG. 4 is a functional block representation of a first exemplary software architecture according to the present invention.

Referring now to FIG. 4, one exemplary embodiment of the software architecture of the present invention is described. While the following discussion is cast in terms of one or more Conservation Bandwidth Manager (CBM) entities resident at the servicing node and/or distributed over the various components of the network, it will be appreciated that other architectures may be used.

As shown in FIG. 4, the basic CBM architecture 400 of the invention comprises a CBM entity 402 running on the servicing node 404 (e.g., the head-end 150, or alternatively the local service node 182) which is in process communication with the exemplary Watch TV (or similar) applications 406 running on the CPE 106. The CBM entity 402 operates to, inter alia, (i) receive session requests associated with HD user channels from the CPE 106 during HD simulcast periods; (ii) determine whether other sessions for that same user channel are established; (iii) verify that the requested HD content is in fact available for broadcast; (iv) assign bandwidth (QAMs) to the incoming session requests when the requested content is available and no other sessions are established with the local service area; and (v) transmit the physical channel allocation (tuning) information to the CPE within the relevant service area when a channel has been established, thereby allowing the CPE 106 to map the selected user channel to the assigned physical channel.

Session requests are received by the CBM 402 from the CPE via upstream OOB channels (reverse data channels) or other pathways, and processed within the CBM to extract the required information contained therein including, e.g., the requested channel or program ID. Other information may also be included within the request and extracted at the CBM 402, such as local service node ID, CPE or user ID, a transmission or local timestamp, coding, CRC or encryption data, etc. Any number of different protocols can be used for this purpose, such as for example those specified in Part 6 of "MPEG-2: Digital Storage Media-Command And Control" (referred to as DSM-CC) defined under the ISO/IEC 13818-6 International Standard, a Trivial File Transfer Protocol (TFTP), Real Time Protocol (RTP/RTCP), TCP/UDP, or Session initiation Protocol (SIP).

In one embodiment, the request process is user-agnostic; i.e., the CBM 402 need not identify which CPE in particular issued the session request, but rather need only know which local node 182 the requesting CPE is serviced by. This is possible since the tuning/mapping information ultimately generated by the CBM 402 after channel allocation and session initiation can be broadcast to all CPE 106 within the relevant local node. There is, under this paradigm, no intrinsic benefit to identifying which CPE initiated the local session; all that the CBM 402 need know at any given point in time is that an (HD) session exists, or it does not.

In another variant, the CBM 402 is given additional "intelligence" to specifically identify the requesting CPE 106. This functionality can be accomplished by the CBM extracting the CPE or user ID information from the request message as previously described. This approach may be useful where it is desirable to validate or authenticate a request, or a request from a particular user as compared to another (such as where selective or premium service plans are in effect).

Determination of the existence of other sessions for the same user channel (i.e., the simulcast HD channel) is performed by the CBM 402 by, e.g., evaluating a local or global counter of session requests within a prescribed period of time. Where no session requests have been received (counter=0), the algorithm for establishing a new session (and allocating a new QAM) is entered. Where the counter ≥1, the CBM 402 enters an algorithm to (i) obtain the relevant tuning information for that session, and (ii) transmit this information to all or a subset of the CPE within the local service area.

As noted above, the CBM 402 may also optionally determine whether the requested (HD) content is in fact available for broadcast. This can be accomplished by, e.g., signaling another process within the head-end 150 or local service node 182, or alternatively periodically evaluating service or status messages issued by a content source entity within the head-end. The former approach advantageously reduces network overhead, since status messages/signals are only issued when required, as opposed to periodically (whether they are needed or not).

In terms of transferring the tuning information to the CPE (requesting and otherwise), one embodiment of the invention simply broadcasts the tuning information for the assigned physical channel to each of the CPE within the relevant portion of the network (e.g., local service area) when it is obtained. Alternatively, the tuning information can be issued on a demand/request basis only, such as where the Watch TV or similar application within the CPE tuning to the already assigned and mapped user channel issues a request for tuning information. This request can even take on substantially identical form to the request issued for session establishment (discussed previously) if desired. The CBM 402 receives the request, checks the counter or other indicia to determine that a session has already been established, and then issues the tuning information.

Figure 4A:
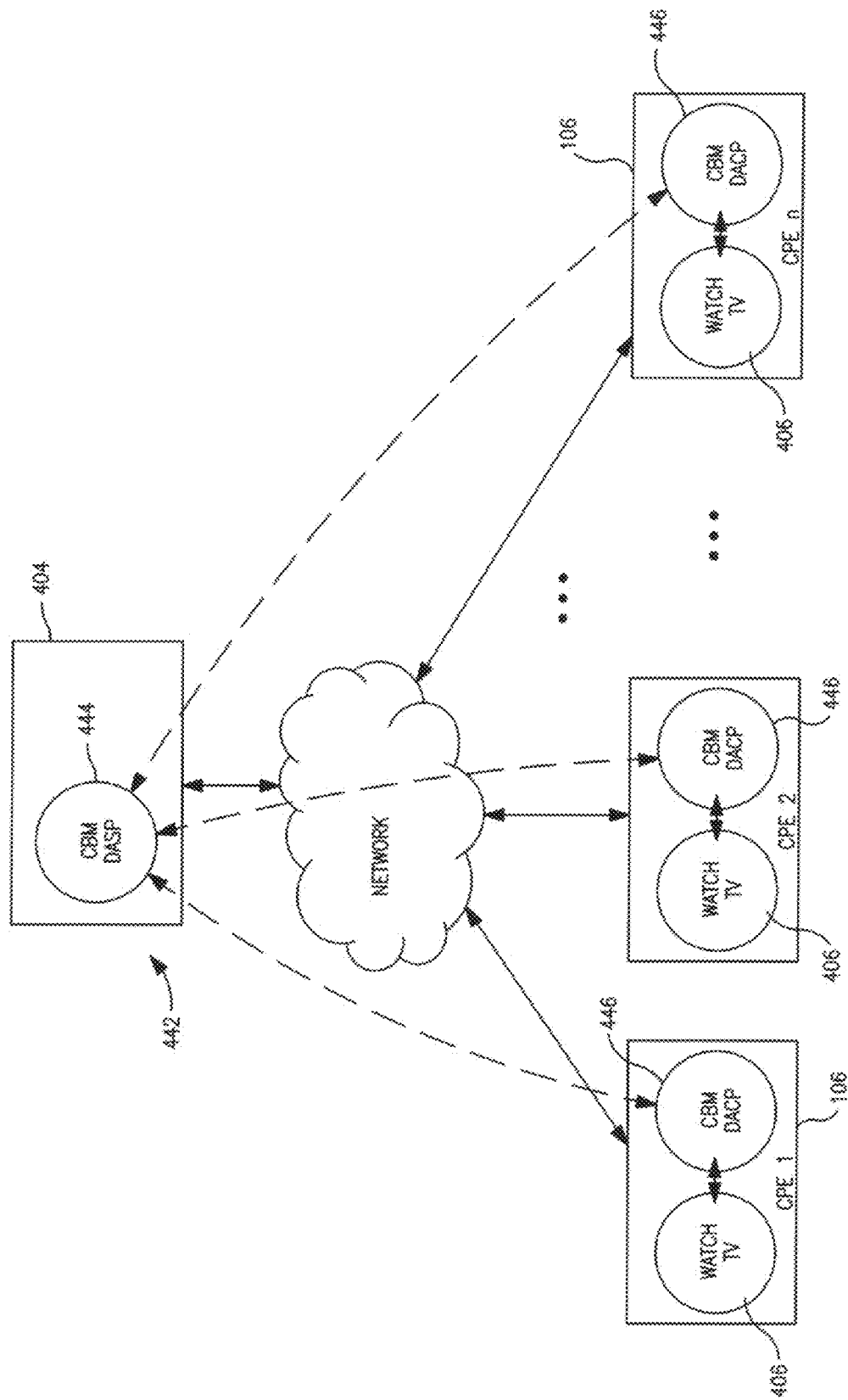
FIG. 4a is a functional representation of a second exemplary software architecture according to the present invention, utilizing a distributed application.

FIG. 4*a* illustrates an alternate software architecture 440 according to the invention, wherein the CBM 442 comprises a distributed application (DA) of the type well known in the programming arts. For example, the apparatus and methods described in U.S. Pat. No. 6,687,735 to Logston, et al. issued Feb. 3, 2004 and entitled "Method and apparatus for balancing distributed applications", incorporated herein by reference in its entirety, may be used consistent with the present invention. The server portion 444 of the CBM 440 at the servicing node communicates with the client portion(s) 446 at each CPE 106 via in-band or OOB physical channels, thereby forming logical channels between the servicing node process 444 and the CPE portion 446. The client portion 446 also communicates with the Watch TV 406 or other application within the CPE 106.

Figure 4B:
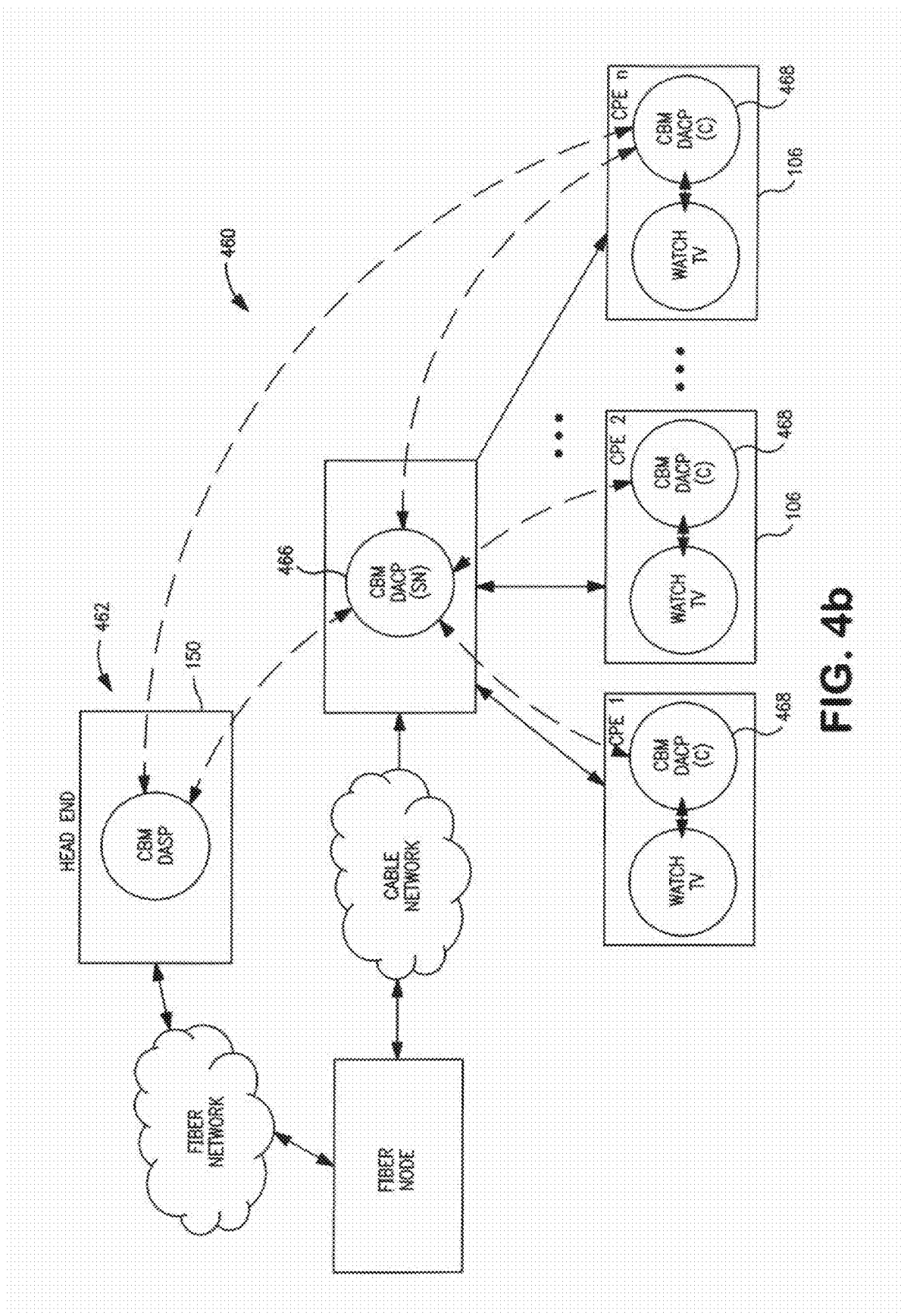
FIG. 4b is a functional representation of a third exemplary software architecture according to the present invention, utilizing a distributed application having client portions disposed at the CPE and local service node.

FIG. 4*b* illustrates another alternate software architecture 460 according to the invention, wherein the CBM 462 comprises a distributed application (DA) which has client portions 466, 468 located both on the local service node 182

(e.g., on the server device of FIG. 5) and the CPE 106. The server portion 464 of the CBM 460 at the head-end 150 communicates with the CPE client portions 468 indirectly via the service node client portion 466. As in the embodiment of FIG. 4a, the CPE client portions 468 also communicate with their respective Watch TV 406 or other application within the CPE 106. The Watch TV application 406 may also be configured to communicate directly with the service node client portion 466 if desired. Furthermore, as described in greater detail below, the service node client portion 466 may be in communication with those of other nodes in order to coordinate bandwidth conservation efforts including, e.g., the allocation of channels to HD session requests.

Figure 5:
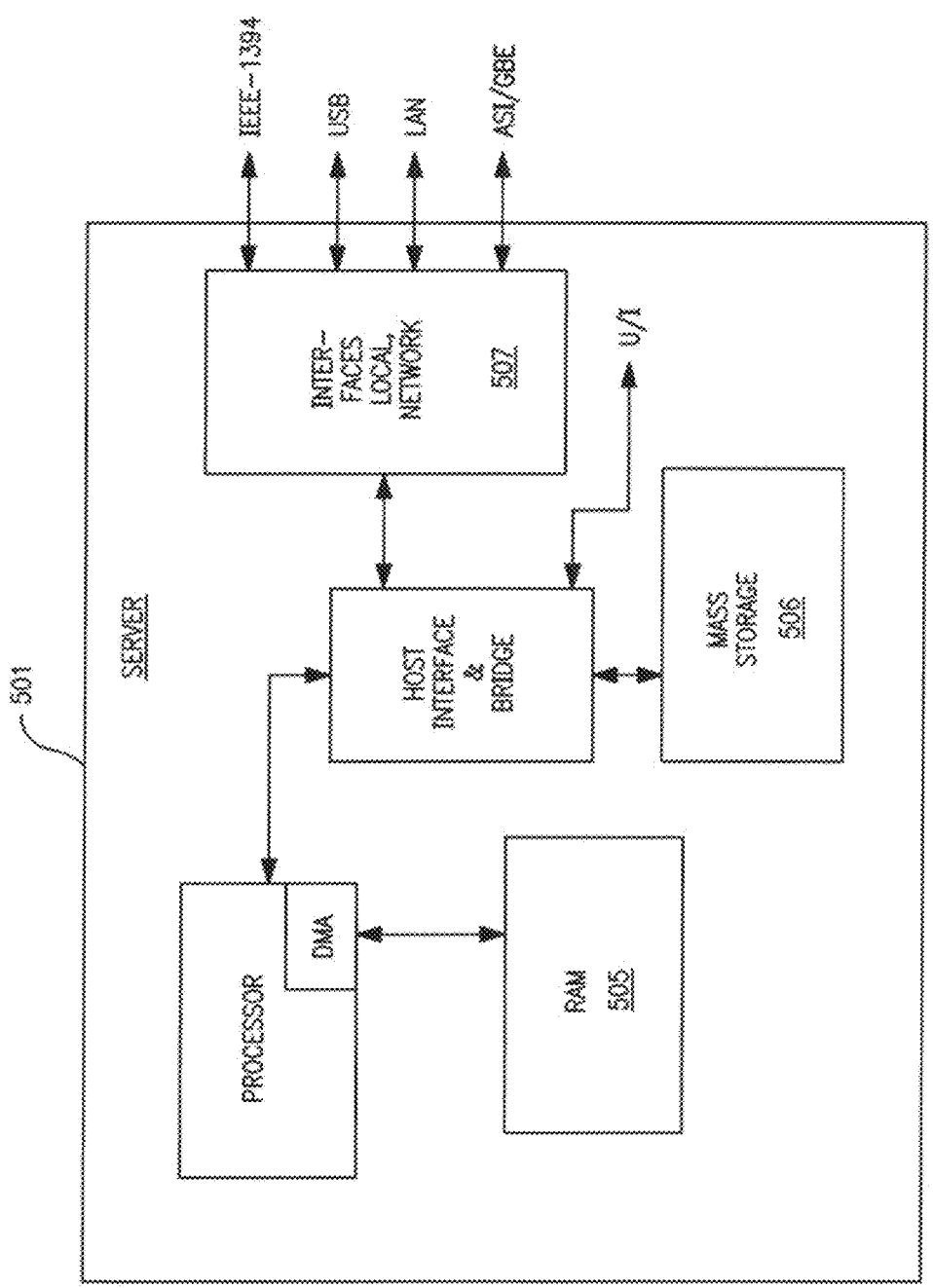
FIG. 5 is a functional block diagram illustrating an exemplary network server device according to the invention.

Referring now to FIG. 5, a first embodiment of the improved network server device with bandwidth conservation capability according to the present invention is described. It will be appreciated that while described in the context of a device disposed at the head end or local service node 182 of FIG. 1b, the device may be adapted for use at other locations within the network.

Server Device

As shown in FIG. 5, the device 501 generally comprises an OpenCable-compliant network server module including a digital processor(s) 504, RAM 505, mass storage device 506, and a plurality of interfaces 507 for connection with other network apparatus such as LANs, the local service node hardware, IP routers and other packet network devices, network management and provisioning systems, local PCs, etc. Other components which may be utilized within the server device 501 (depending on where it is employed and how it is physically implemented) include RF tuner stages, modulators/demodulators, encryption/decryption, amplifiers, board level electronic components, as well as media processors and other specialized SoC or ASIC devices. Support for various processing layers and protocols (e.g., 802.3, DOCSIS MAC, OOB channels, DHCP, SNMP, H.323/RTP/RTCP, VoIP, SIP, etc.) may also be provided as required.

The server device 501 of FIG. 5 may take any number of physical forms, comprising for example one of a plurality of discrete modules or cards within a head-end component or local service node device of the type well known in the art. The server may also comprise firmware, either alone or in combination with other hardware/software components such as those previously described. Alternatively, the server module 501 may be a stand-alone device disposed at the head-end, local node or other location. Numerous other configurations may be used. The server device 501 may also be integrated with other types of components (such as satellite transceivers, encoders/decoders, etc.) and form factors if desired.

It can also be appreciated that the methods of the present invention may be practiced using any configuration or combination of hardware, firmware, or software, and may be disposed within one or any number of different physical or logical entities. For example, the CBM functionality described above may take the form of one or more computer programs running on a single device disposed within the network (such as the server module 501), such as at a head-end, node, or hub. As yet another example, portions of the functionality may be rendered as a dedicated or application specific IC having code running thereon. Myriad different configurations for practicing the server device of the invention will be recognized by those of ordinary skill in the network arts provided the present disclosure.

Exemplary CPE

Figure 6:
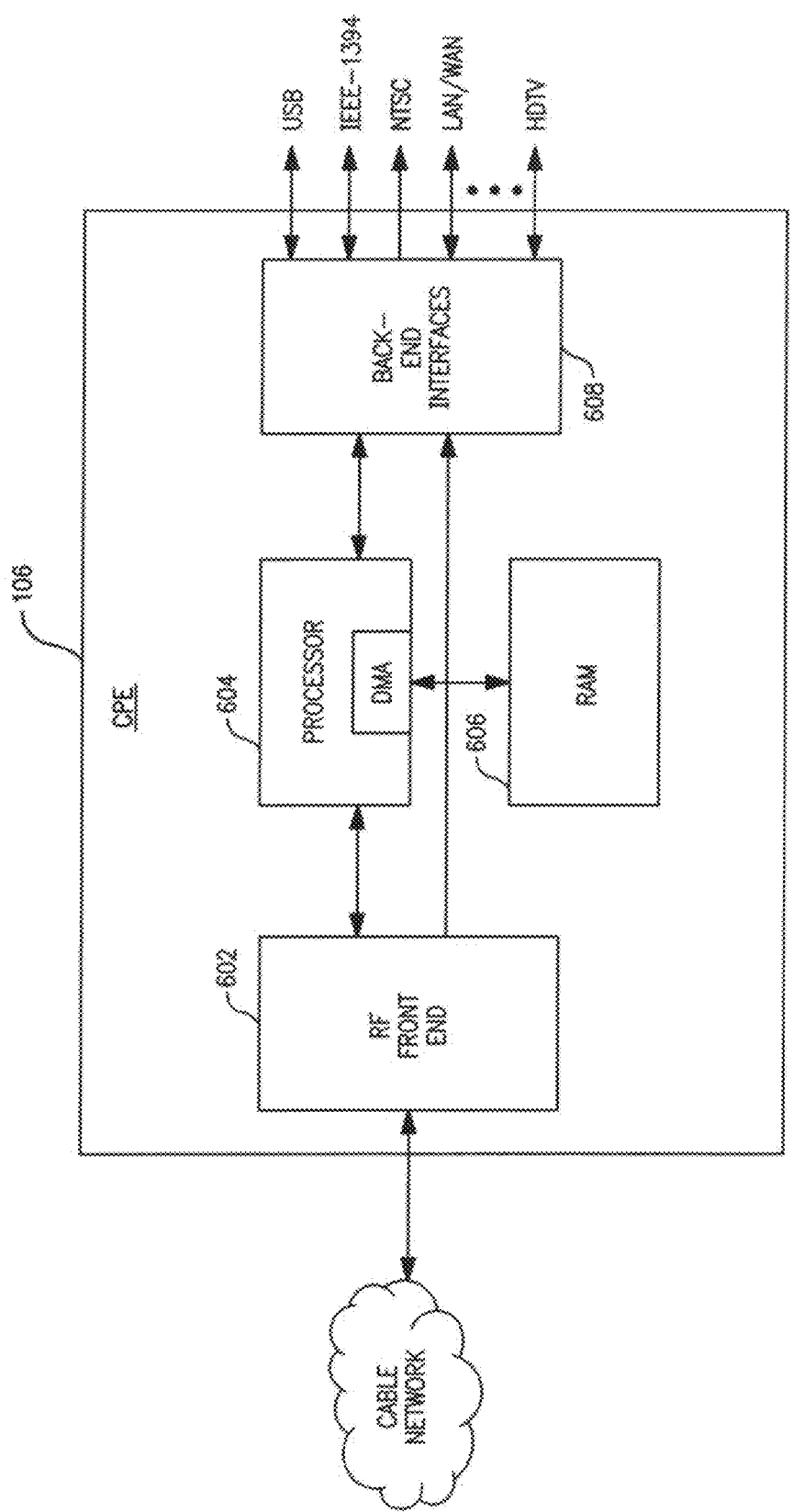
FIG. 6 is a functional block diagram illustrating an exemplary CPE device according to the invention.

FIG. 6 illustrates a first embodiment of the improved CPE 106 according to the present invention. As shown in the simplified diagram of FIG. 6, the device 106 generally comprises and OpenCable-compliant embedded system having an RF front end 602 (including tuner and demodulator/decryptors) for interface with the HFC network 101 of FIGS. 1-1b, digital processor(s) 604, storage device 606, and a plurality of interfaces 608 (e.g., video/audio interfaces, IEEE-1394 "Firewire", USB, serial/parallel ports, etc.) for interface with other end-user apparatus such as televisions, personal electronics, computers, WiFi or other network hubs/routers, etc. Other components which may be utilized within the device (deleted from FIG. 6 for simplicity) various processing layers (e.g., DOCSIS MAC or DAVIC OOB channel, MPEG, etc.) as well as media processors and other specialized SoC or ASIC devices. The CPE 106 may also comprise an integrated HD decoder, thereby relieving any connected monitors or other devices from the requirement of having such a decoder. These additional components and functionality are well known to those of ordinary skill in the cable and embedded system fields, and accordingly not described further herein.

The CPE 106 of FIG. 6 is also provided with an OCAP 1.0-compliant application and Java-based middleware which, inter alia, manages the operation of the device and applications running thereon. It will be recognized by those of ordinary skill that myriad different device and software architectures may be used consistent with the tuning functions of the present invention, the device of FIG. 6 being merely exemplary. For example, different middlewares (e.g., MHP, ARIB, or ACAP) may be used in place of the OCAP middleware of the illustrated embodiment.

The exemplary CPE 106 further comprises a conventional "Watch TV" application 406 or the like, which services those program or user channels available over the network. The Watch TV application, residing in memory, provides such functions as channel navigation control, channel selection in response to a channel change event, etc. In the illustrated embodiment, the Watch TV application further comprises all necessary functionality need to support both the channel mapping and session request/setup features previously described with respect to FIGS. 2 and 3A-3B.

Specifically, regarding channel mapping, the application is configured to map the user's (program) channels to corresponding physical channels through use of program IDs, transport stream IDs, or other similar information as is well known in the art. Several salient distinctions exist over the prior art, however, including that the application of the present invention is further adapted to (i) map 2 or more program channels to the same physical channel(s); and (ii) utilize schedule or other data to selectively implement the mapping.

The utilization of the schedule or other data can be accomplished in any number of different ways. For example, in one variant, the Watch TV or other application 406 is adapted to identify data (e.g., metadata) contained within one or more communications from an external network or third party entity. As previously described, such data may be transmitted via a downstream OOB channel, in-band, or via an alternate interface such as an IP channel or wireless interface. This data may be contained in a dedicated communication (e.g., an OOB "mapping" message format or protocol), or included with another scheduled or unscheduled communication from the network (such as an EPG download, application download, CPE profile query, etc.). The data may also be resident on the CPE before use, such as where mapping tables are stored in memory or mass storage and subsequently accessed as previously described.

The CPE application of the present invention is also optionally configured to generate requests or signals to the servicing network entity (e.g., local node 182 in FIG. 1*b*, or the head-end 150) that are transmitted upstream to initiate the allocation of one or more physical channels and the spawning of a new session for the CPE. As previously discussed, this request may comprise, e.g., a simple message addressed to the relevant software process within the servicing entity (or its proxy formatted according to any number of well known protocols, or alternatively some other type of communication. The application is also configured to receive communications from the servicing node, head-end, third party network entity, etc. containing the PID/QAM/TSID tuning information which enables the CPE 106 to tune to the newly assigned physical channel (and map the program channel thereto).

However, as noted above, this mapping is potentially dynamic (if outside any programmed tear-down latency period previously discussed), since the logic utilized by the servicing entity to assign the physical channel first checks to see if other physical channels have already been assigned within that local service node (see discussions of FIGS. 3A-3B and 4 above) when servicing the HD session request. If so, the servicing entity merely passes the existing channel tuning information to the requesting CPE (as opposed to allocating a new channel). Thus, if a given user tunes away from the HD-carrying program channel for which they were the first user within their service node, and then subsequently tunes back, they may or may not be passed the same tuning information (e.g., since other CPE may now be tuned to the same channel). If other CPE is using the same HD user channel, then the re-joining CPE will be passed the same information. If no other CPE is using the HD user channel, and the session is torn down in the intervening period between the tune-away and the tune-back, a new physical channel (e.g., QAM or QAM set) will be allocated by the servicing entity, which may or may not be the same one(s) as before.

Stagger-Cast Variants

It will be recognized that the apparatus and methods of the present invention can also be used to afford noted benefits such as increased HD density. This could, for example, be used to provide increased near-VOD (NVOD) capability. Specifically, in one embodiment based on the switched digital architecture previously described, programming is "stagger-cast" such that time-shifted copies of a given high vide quality (e.g., HD) program are transmitted over one or more QAMs allocated to the HD session request issued by a given CPE. Stagger-cast is a process wherein identical copies of the same program, with their start times staggered by some duration, are multiplexed with each other to form a transport stream. When a viewer tunes to the transport stream, the viewer can start watching the program from the beginning as soon as the start of a next staggered copy of the program is received. This results in a VOD-like functionality without having to wait for a long period of time (e.g., until the next scheduled iteration of the complete movie, such as the next 2-hour slot). For example, twenty-four copies of a movie of 120 minutes duration can be staggered to start 5 minutes apart in a single cable QAM channel, with each copy being assigned approximately 1.2 Mbps bandwidth. When the viewer tunes into such a multiplex, he is never more than 5 minutes away from starting point of a copy of the program.

As noted above, each time-shifted version of the program comprises a different broadcast. Thus, the MSO can provide the user with a near-VOD capability, with the level of latency (i.e., how "near" the NVOD really is to true VOD, such as the 5 min. referenced in the above example) being determined by the metrics of the time delay and multiplexing process.

Hence, in one variant, the NVOD or stagger-cast service provided to a user within a given local service area or node can be instigated based on an HD session request from that user, as opposed to being constantly broadcast into that node. When the first user's session is established, and one or more QAMs allocated as previously described herein, the TS broadcast onto the allocated QAM(s) can comprise a plurality of stagger-cast copies of the requested HD program. As other users within the same service area/node tune into the scheduled HD broadcast thereafter, they can be given the option (as can the session-initiating CPE) of joining at the in-progress (i.e., non-time shifted) portion of the TS multiplex, or alternatively a time-shifted portion. Hence, late-arrivers can still catch the beginning of the program, and any of the users on the service node can be given NVOD capability.

Furthermore, where no other HD programming is scheduled into the slot following the aforementioned stagger-cast HD program, the staggered copies of the HD program can literally run over the top of the following SD broadcast on the same program channel, because the other aspects of the present invention (i.e., mapping of the simulcast SD program channel to the "base" SD program channel during SD/SD periods) allows the CPE 106 to map the simulcast program channel back to the base channel if the user desires to watch the follow-on SD programming. Note that this information (i.e., the schedule information indicating that an SD/SD period is beginning) is already present within the CPE, such as from the EPG, as previously described with respect to FIG. 2 herein.

Alternatively, if the viewer wants to continue to watch the HD stagger-cast (assuming they are watching a copy which runs into the follow-on SD slot), they can just stay tuned to the physical channel associated with the established HD session. Different mechanisms are envisioned for giving the user various levels of control over this process if desired, including for example (i) offering the user an on-screen and/or audible prompt at the point where the HD stagger-cast program begins to run into the subsequent SD slot, and allowing the user to choose which they desire to watch; (ii) keeping the user locked onto the current (HD) physical channel unless they tune away to the SD "base" program channel or other program channel; or (iii) automatically tuning the user away from the HD simulcast channel to the SD base program channel, and requiring the user to tune back to the simulcast (HD) program channel (and hence its associated physical channel carrying the stagger-cast HD TS) and rejoin their stagger-cast copy, or a later one if available.

Note that if the latent HD viewer is the sole remaining user on the HD session, and they tune away from the session for a period of time allowing the HD session within their service node to collapse, a subsequent request to rejoin the "latent" HD session can optionally be honored simply be re-allocating the stagger-cast TS stream to a new QAM (or even the same one), and advise the requesting user accordingly as previously described with respect to FIGS. 3A-3B. Hence, the user (and any other users who want to join the latent HD session late) is not penalized for switching, or being switched, away. In one embodiment, when the last stagger-cast copy within the TS is complete, then the operation of the user's CPE 106 simply reverts to its normal behavior (i.e., maps to an existing base SD physical channel when the simulcast program channel is selected).

At completion of the latent HD program, the CPE can be programmed to immediately map (tune) to the physical channel associated with the base SD program channel if desired, thereby making the transition between the end of the HD stagger-cast program copy and the "in-progress" SD broadcast program largely seamless. This seamless transition is advantageously available regardless of which stagger-cast copy the HD viewer is watching; the CPE 106 simply maps to the SD base program channel when the HD program is completed (as can be determined by any number of mechanisms, such as in-band or OOB signaling, expiration of a local clock, etc.).

Alternative to allowing the stagger-cast copies to run into the following (SD) slot on the simulcast program channel is scheduling the slots of both the SD version and the simulcast HD version as NVOD events, each with a common overall duration which exceeds the program's actual length by some amount. The physical channel providing the otherwise broadcast SD content can also be stagger-cast if desired (e.g., utilize a multiplexed TS), with even finer granularity, i.e., less user latency, than the HD simulcast due to the increased bandwidth requirements of HD over SD. This "simulcast SD NVOD" is at the expense of system bandwidth however, since the staggered copies of the SD broadcast consume capacity which could otherwise be used for other content.

It will be appreciated that under any paradigm, there is a trade-off between the aforementioned latency versus and the number of copies of the same program that are multiplexed together. For example, the above exemplary stagger-cast stream could also be constructed using 12 copies of the program, staggered to start 10 minutes apart. Therefore, if a service provider wants to offer to the viewers a service that reduces the wait or latency of a given point in the program being again accessible, more copies of the programs will have to be multiplexed together.

If a stagger-cast technique is to be applied to high quality programs (such as HD programs) at the typical 12-18 Mbps compression rate, only about 3 copies can be stagger-cast together. However, if desired, this rate can be significantly increased by implementing the wideband multiplex apparatus and methods described in U.S. patent application Ser. No. 11/013,671 filed Dec. 15, 2004, entitled "Method And Apparatus For Wideband Distribution Of Content", and issued as U.S. Pat. No. 9,723,267 on Aug. 1, 2017, previously incorporated herein. Specifically, by using the wideband multiplex with multiple (e.g., 8, 4, or 2) QAMs, additional bandwidth is available to include more copies, thereby reducing the wait time or latency experienced by the viewer. As an example, in a wideband multiplex consisting of four QAM channels, 12 copies of an HD program of 120 minutes duration each can be stagger-cast, assuming 12 Mbps each, with the resultant wait time being less than 10 minutes.

Therefore, the use of a wideband multiplex offers a system operator the ability to provide high quality (e.g., HD) stagger-cast near-VOD services with minimal user wait time. However, even with no wideband multiplex, the operator can provide HD stagger-cast (and hence NVOD), just with a longer latency than would be available using the wideband approach.

Operations/Business Rules Engine

In another aspect of the invention, the aforementioned CBM (e.g., rendered as one or more computer programs) includes a so-called "rules" engine. This engine comprises, in an exemplary embodiment, a series of software routines running on the server device 501 or other associated hardware/firmware environment adapted to control the operation of the CBM algorithms previously described. These rules may also be fully integrated within the CBM 402 itself, and controlled via e.g., a GUI on a PC connected to the server 501. In effect, the rules engine comprises a supervisory entity which monitors and selectively controls, via the CBM 402, (i) the mapping of program or user channels to physical channels for the CPE 106 within the designated service area, (ii) the establishment and tear-down of physical channels and sessions in response to requests for HD or other such content, and (iii) the provision of tuning information to the CPE. The rules engine dynamically (or manually) controls the operation of the CBM 402 to implement a prescribed set of rules; hence, the CBM 402 can be thought of as a "toolbox" by which the rules engine implements its higher-level supervisory and analytic functions. These rules may be, e.g., operational or business-oriented in nature, and may also be applied selectively in terms of time of day, duration, specific local areas, or even at the individual user level.

For example, one rule implemented by engine may comprise only mapping an SD program scheduled on a simulcast user channel to a common physical channel with the "base" SD user channel (as described with respect to FIG. 2 herein) when a certain operational parameter is reached; e.g., a certain level of bandwidth consumption within the network. Another rule might comprise instigating such mapping when there is a QAM or other hardware failure on the network, thereby conserving the remaining bandwidth for user content delivery.

Regarding establishment of the HD session, one rule might impose a moratorium on establishing or allocating new physical channels/QAMs to HD session requests until a certain minimum threshold of available bandwidth is present, thereby avoiding contention for bandwidth resources with "premium" services such as VOD or the like. Specifically, as the available bandwidth on the network (or within a given local node) runs low, it may be desirable to impose a rule that prevents allocation of the few remaining QAMs to HD sessions, since those users already have access to the corresponding "simulcast" SD programming via an existing QAM, and will only be deprived of the enhancement of HD over SD. Rather, it may perhaps be preferable to give first access to the remaining bandwidth assets to those customers with the highest subscription plans, longest subscription tenure, or the highest profit margin per unit bandwidth.

Should suitable additional bandwidth become available during the "HD broadcast", then the users submitting requests for the HD content could be selectively switched over to the newly established QAM(s) supporting the HD sessions.

It will also be appreciated that advertising or other comparable services (such as "TV-commerce") can be considered a "service level" which can act as the basis for channel assignment and conservation decisions. Specifically, HD sessions or other bandwidth-consuming events can be allocated to those users which will make best use of the bandwidth in terms of monetary return, profit, or some other business performance metric. However, the advertising/service itself can be used as a basis or parameter on which bandwidth conservation decisions are made, such as where it is desired to support a minimum level of advertising or TV-commerce service first before then allocating bandwidth to simulcast HD sessions as previously described with respect to FIG. 3A-3B. Hence, an MSO or other entity may actually set aside or delay HD session requests in favor of advertising or commerce-related bandwidth. Similarly, the MSO may desire to have a certain minimum level or quota of gaming or other content. Many other approaches and combinations are envisaged consistent with the invention.

The establishment of the HD or similar session in response to the user's tuning request (e.g., as shown in FIGS. 3A-3B) might also be treated as a premium or even "pay per" event if desired. For example, during periods when the SD content is scheduled for simulcast (and hence the simulcast program channel is mapped to the base program channel (and its associated physical channel), the user would be given unlimited access. However, during periods when the HD simulcast is scheduled, the user's access might be restricted or authenticated, such as by applying a rule that says that only customers with a certain subscription level (as determined by data resident either at the head-end, servicing node, or on the CPE itself) will be provided access. This access can also be made conditional, such as where the aforementioned rule is only applied when total available bandwidth at the node (or even network-wide) is below a prescribed level. If the user's access is restricted, the tuning event can be made to appear seamless (i.e., they just remain tuned to the physical channel carrying the SD content), or alternatively the user can be given a prompt to take some further action, a notice that the HD content is not available to them, etc.

In another alternate embodiment where wideband tuners are utilized within the network infrastructure and CPE (see, e.g., U.S. patent application Ser. No. 11/013,671 entitled "Method And Apparatus For Wideband Distribution Of Content", previously incorporated herein), other operational/business rules may be applied. For example, a QAM multiplex set for a given wideband CPE might comprise 8 different QAMs under normal (i.e., non-constrained) bandwidth conditions. However, when bandwidth conservation is imposed, all or a subset of the wideband sets can be collapsed to a lesser number of QAMs, such as 4 or even 2. This reduction of QAMS in each set has the effect of degrading the pool size and hence statistics associated with the wideband statistical multiplexing process; however, this degradation may be more than offset by the gains in available QAMs for, e.g., premium services or the like. Note that under certain circumstances, additional bandwidth may actually be gained by increasing the number of QAMs within a wideband multiplex. Hence, the present invention contemplates the manipulation of QAM multiplex set size in either direction as may be dictated by operational or other considerations.

The aforementioned rules engines of the exemplary CBM may be implemented in a local or global (i.e., network-wide) fashion. For example, in one variant, the CBM and associated rules engine operate at the local service node level, in effect treating the local node as the entire network for purposes of bandwidth conservation. In another variant, the CBM/rules engine is applied across multiple local service nodes. In yet another variant, the CBM/rules engine is applied globally across the entire network.

Note that when operating at the local service node level, the CBM/rules engine of the present invention may communicate with other processes (e.g., other CBM/rules engines for other local service areas) in order to optimize the operation of one or both. As a simple example, consider multiple local service areas distributed over multiple time zones; where certain operational conditions exist in the first time zone (e.g., very high demand for particular services such as HD programming associated with an event which is also staggered across the zones). This operational profile data can be transmitted to the CBM/rules engine of a service area in a later time zone to compensate for the increased HD demand.

As another example, local service nodes which have the option of switching between two parent or source nodes might base such switching decisions on information derived from another local service node; e.g., one which operates off the same parent/source node. Where that other local node is experiencing exceptionally high demand for HD services (and hence placing a larger load on the first parent/source node), then the second local service node might be configured to switch to a second parent node, thereby reducing demand on the first parent node.

Myriad other schemes for utilizing data between individual nodes of the network in conjunction with the methods of the present invention will be realized by those of ordinary skill. Note also that the operation of the rules engine of the present invention may be coordinated or even integrated with the functionality provided by the rules engine described in the U.S. patent application Ser. No. 10/881,979 filed Jun. 29, 2004, cited above.

It will be recognized that while certain aspects of the invention are described in terms of a specific sequence of steps of a method, these descriptions are only illustrative of the broader methods of the invention, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the invention disclosed and claimed herein.

While the above detailed description has shown, described, and pointed out novel features of the invention as applied to various embodiments, it will be understood that various omissions, substitutions, and changes in the form and details of the device or process illustrated may be made by those skilled in the art without departing from the invention. The foregoing description is of the best mode presently contemplated of carrying out the invention. This description is in no way meant to be limiting, but rather should be taken as illustrative of the general principles of the invention. The scope of the invention should be determined with reference to the claims.

What is claimed is:

1. A computerized method of bandwidth management in a content delivery network having a plurality of computerized client devices, said computerized method comprising:
   identifying a first and a second digitally rendered program content associated with a session, said first and said second digitally rendered program content comprising digitally rendered primary content and configured for delivery in sequence, said session established between an entity of said content delivery network and at least one of said plurality of computerized client devices;
   algorithmically evaluating one or more criteria associated with said at least one of said plurality of computerized client devices to determine a likelihood of said at least one of said plurality of computerized client devices requiring said session, after completion of said first digitally rendered program content, for viewing of said second digitally rendered program content, said algorithmically evaluating said one or more criteria comprising analyzing metadata, said metadata indicative of whether: (i) said first digitally rendered program is of a common genre as said second digitally rendered program, and (ii) a tendency of said at least one of said plurality of computerized client devices to transmit data requesting digitally rendered primary content of said common genre in sequence; and determining, based at least in part on said algorithmically evaluating, whether to maintain or initiate disestablishment of said session upon completion of said first digitally rendered program content.

2. The method of claim 1, further comprising, based at least in part on said algorithmically evaluating, maintaining said session for delivery of digitally rendered secondary content and said second digitally rendered program content, wherein said first and said second digitally rendered program content are separated spatially only by said digitally rendered secondary content.

3. The method of claim 1, further comprising causing disestablishment of said session prior to a beginning of said second digitally rendered program based on said determining.

4. The method of claim 3, wherein said causing disestablishment of said session prior to said beginning of said second digitally rendered program comprises maintaining said session for a period time after completion of first digitally rendered content, said first and second digitally rendered program content being separated spatially only by said digitally rendered secondary content, said maintaining based at least in part on channel switching pattern data associated with said at least one of said plurality of computerized client devices, said channel switching pattern data indicative of at least one user behavior.

5. The method of claim 1, wherein said session comprises a session used to deliver high-definition (HD) content.

6. The method of claim 5, further comprising causing disestablishment of said session based on said determining, wherein said session used to deliver said HD content is replaced with a simulcast of standard-definition (SD) content upon or after said disestablishment.

7. The method of Claim 2, wherein said digitally rendered secondary content comprise one or more of: (i) an advertisement, (ii) a promotion, and/or (iii) an introduction.

8. The method of claim 1, wherein said one or more criteria is/are related to a total number of digitally rendered programs provided in said session.

9. The method of claim 1, wherein:
said analyzing metadata comprises (i) identifying that said first digitally rendered program is of said common genre of said second digitally rendered program, and (ii) identifying that said at least one of said plurality of computerized client devices does not tend to request digitally rendered primary content of said common genre in sequence; and
said method further comprises initiating disestablishment of said session upon completion of said first program content based at least on said analyzing.

10. The method of claim 1, wherein:
said analyzing metadata comprises (i) identifying that said first digitally rendered program is of said common genre of said second digitally rendered program, and (ii) identifying that said at least one of said plurality of computerized client devices tends to request digitally rendered primary content of said common genre temporal succession; and said method further comprises maintaining said session after completion of said first program content based at least on said analyzing.

11. A computer readable apparatus comprising a non-transitory storage medium comprising at least one computer program having a plurality of instructions, said plurality of instructions configured to, when executed on a processing apparatus:
identify a first and a second digitally rendered program content associated with a session, said session established between an entity of said content delivery network and at least one of said plurality of client device, said first and second program content comprising digitally rendered primary content and configured for delivery in sequence;
algorithmically evaluate one or more criteria associated with said at least one of said plurality of client devices to predict whether said at least one of said plurality of client devices will request said second digitally rendered program content after completion of said first digitally rendered program content, said algorithmic evaluation of said one or more criteria comprising analysis of metadata, said metadata indicative of whether: (i) said first digitally rendered program is of a common service level as said second digitally rendered program, and (ii) a tendency of said at least one of said plurality of computerized client devices to request digitally rendered primary content of said common service level in sequence; and
based at least in part on said algorithmic evaluation, implement computerized logic comprising:
when said prediction indicates that said at least one of said plurality of client devices will not request said second digitally rendered program content based on said analysis identifying that: (i) said first digitally rendered program comprising said common service level as said second digitally rendered program, and (ii) said at least one of said plurality of computerized client devices has a tendency to not request digitally rendered primary content of said common service level in sequence, initiate disestablishment of said session upon completion of said first digitally rendered program content.

12. The computer readable apparatus of claim 11, wherein said implementation of said computerized logic further comprises when (i) said first and said second digitally rendered program content are further configured for delivery with digitally rendered secondary content inserted spatially between said first and said second digitally rendered program content, and (ii) said prediction indicates that said at least one of said plurality of client devices will not request said second digitally rendered program content, maintain said session for delivery of at least a portion of said secondary content, and
initiate said disestablishment prior to a beginning of said second digitally rendered program content.

13. The computer readable apparatus of claim 11, wherein said session comprises a session established to deliver only high-definition (HD) content.

14. The computer readable apparatus of claim 13, wherein said plurality of instructions are further configured to instantiate a session established to deliver only standard-definition (SD) content in place of said session established to deliver said HD content.

15. The computer readable apparatus of claim 12, wherein said digitally rendered secondary content comprises one or more of: (i) an advertisement, (ii) a promotion, and/or (iii) an introduction.

16. The computer readable apparatus of claim 11, wherein said one or more criteria is/are related to a total number of programs provided in said session.

17. The computer readable apparatus of claim 11, wherein said plurality of instructions are further configured to, when executed, disestablish said session based at least in part on data indicative that said at least one of said plurality of client devices has tuned away from a logical channel associated with said first digitally rendered program content and/or said second digitally rendered program content.

18. Computerized network apparatus configured for use within a network having a plurality of computerized client devices associated therewith, said computerized network apparatus comprising:
  one or more interfaces, said interfaces configured to provide first and second content digital streams to said plurality of computerized client devices via said network;
  processing apparatus;
  storage apparatus in data communication with said processing apparatus and comprising computerized logic executable on said processing apparatus, said computerized logic configured to, when executed:
    cause download of an application to an individual one of said plurality of computerized client devices;
    receive, via said application, a channel switching pattern associated with said individual one of said plurality of computerized client devices;
    evaluate said channel switching pattern, said evaluation comprising an identification of at least one user behavior associated with a user of said individual one of said plurality of computerized client devices; and
    based at least on said at least one user behavior, optimize said provision of said first and second digital content streams, said optimization comprising a delay of a disestablishment of said second digital content stream.

19. The network apparatus of claim 18, wherein said computerized logic comprises an algorithm configured to facilitate said optimization.

20. The network apparatus of claim 18, wherein:
  said at least one user behavior comprises rapid channel hopping; and
  said first digital content stream is associated with one or more logical channels tuned to or tuned away from as part of said rapid channel hopping.

21. The network apparatus of claim 18, wherein said first and second content streams comprise standard definition (SD) and high definition (HD) content data streams, respectively.

22. The computer readable apparatus of claim 11, wherein said computerized logic further comprises logic configured to, based at least on said prediction indicates that said at least one of said plurality of client devices will request said second digitally rendered program content, maintain said session upon completion of said first digitally rendered program content.

* * * * *